(12) United States Patent
Connell et al.

(10) Patent No.: US 12,731,011 B2
(45) Date of Patent: Sep. 8, 2026

(54) METHODS, SYSTEMS, ARTICLES OF MANUFACTURE, AND APPARATUS TO DETERMINE FIELD ACCESS READINESS

(71) Applicant: Deere & Company, Moline, IL (US)

(72) Inventors: Richard J. Connell, Slater, IA (US); John P. Just, Ames, IA (US); Erik A. Sorensen, Warren, PA (US)

(73) Assignee: Deere & Company, Moline, IL (US)

( * ) Notice: Subject to any disclaimer, the term of this patent is extended or adjusted under 35 U.S.C. 154(b) by 770 days.

(21) Appl. No.: 18/148,953

(22) Filed: Dec. 30, 2022

(65) Prior Publication Data

US 2024/0220780 A1 Jul. 4, 2024

(51) Int. Cl.

| | |
|---|---|
| ***G06N 20/00*** | (2019.01) |
| ***G01W 1/10*** | (2006.01) |
| ***G06N 3/047*** | (2023.01) |

(52) U.S. Cl.

CPC .............. *G06N 3/047* (2023.01); *G01W 1/10* (2013.01)

(58) Field of Classification Search

None

See application file for complete search history.

(56) References Cited

U.S. PATENT DOCUMENTS

| | | | |
|---|---|---|---|
| 4,253,244 | A | 3/1981 | Kranzler |
| 5,712,782 | A | 1/1998 | Weigelt et al. |
| 6,041,582 | A | 3/2000 | Tiede et al. |
| 6,236,924 | B1 | 5/2001 | Motz et al. |
| 6,505,146 | B1 | 1/2003 | Blackmer |
| 7,167,797 | B2 | 1/2007 | Faivre et al. |
| 7,313,478 | B1 | 12/2007 | Anderson et al. |
| 7,415,333 | B2 | 8/2008 | Anderson |
| 7,434,375 | B2 | 10/2008 | Pickett et al. |
| 7,610,122 | B2 | 10/2009 | Anderson |
| 7,725,233 | B2 | 5/2010 | Hendrickson et al. |
| 7,761,334 | B2 | 7/2010 | Pickett et al. |

(Continued)

FOREIGN PATENT DOCUMENTS

| | | | |
|---|---|---|---|
| AU | 2019365214 | A1 | 5/2021 |
| CN | 202953175 | | 5/2013 |

(Continued)

OTHER PUBLICATIONS

Sun Yat-Sen University Robotics Lab, “Autonomous Takeoff, Tracking and Landing of an UAV on a Moving UGV Using Onboard Monocular Vision,” uploaded on Jan. 16, 2014. (Retrieved on May 9, 2023, https://www.youtube.com/watch?v=lakP1EMtl1w).

(Continued)

*Primary Examiner* — David R Vincent

(74) *Attorney, Agent, or Firm* — Hanley, Flight & Zimmerman, LLC

(57) ABSTRACT

Methods, apparatus, systems, and articles of manufacture are disclosed to determine field access readiness to receive in a neural network a field metric, receive in the neural network a first field operating decision, generate from the neural network a field condition at a time of operation based on the field metric, generate a first probability that a field may be accessed given the field condition at the time of operation based on the first field operating decision and the field condition at the time of operation; and apply the first probability to the field, or subset areas of the field by the field metric.

12 Claims, 16 Drawing Sheets

(56) References Cited

U.S. PATENT DOCUMENTS

| | | | | |
|---|---|---|---|---|
| 7,957,850 | B2 | 6/2011 | Anderson | |
| 8,079,433 | B2 | 12/2011 | Teague et al. | |
| 8,195,342 | B2 | 6/2012 | Anderson | |
| 8,234,010 | B2 | 7/2012 | Thompson et al. | |
| 8,325,025 | B2 | 12/2012 | Morgan et al. | |
| 8,442,700 | B2 | 5/2013 | Anderson | |
| 8,494,727 | B2 | 7/2013 | Green et al. | |
| 8,560,145 | B2 | 10/2013 | Anderson | |
| 8,726,535 | B2 | 5/2014 | Garrido et al. | |
| 8,843,269 | B2 | 9/2014 | Anderson et al. | |
| 9,009,087 | B1 | 4/2015 | Mewes et al. | |
| 9,056,676 | B1 | 6/2015 | Wang | |
| 9,066,464 | B2 | 6/2015 | Schmidt et al. | |
| 9,066,465 | B2 | 6/2015 | Hendrickson et al. | |
| 9,140,824 | B1 | 9/2015 | Mewes et al. | |
| 9,188,518 | B2 | 11/2015 | Snyder et al. | |
| 9,234,317 | B2 | 1/2016 | Chi | |
| 9,439,342 | B2 | 9/2016 | Pasquier | |
| 9,489,576 | B2 | 11/2016 | Johnson et al. | |
| 9,511,633 | B2 | 12/2016 | Anderson et al. | |
| 9,772,625 | B2 | 9/2017 | Gilmore et al. | |
| 10,139,234 | B2 | 11/2018 | Matthews | |
| 10,176,280 | B2 | 1/2019 | Mewes et al. | |
| 10,295,998 | B2 | 5/2019 | Yokoyama | |
| 10,569,875 | B2 | 2/2020 | Flood et al. | |
| 10,721,857 | B2 | 7/2020 | Tippery et al. | |
| 11,212,962 | B2 | 1/2022 | Hendrickson et al. | |
| 11,256,999 | B2 | 2/2022 | Parsons et al. | |
| 11,263,707 | B2 | 3/2022 | Perry et al. | |
| 11,295,331 | B2 | 4/2022 | Wang et al. | |
| 11,432,469 | B2 | 9/2022 | Reimann et al. | |
| 12,110,007 | B2 | 10/2024 | Johnson | |
| 12,172,631 | B2 | 12/2024 | Potter et al. | |
| 12,376,511 | B2 | 8/2025 | Johnson | |
| 12,535,388 | B2 | 1/2026 | Kale et al. | |
| 2002/0198654 | A1 | 12/2002 | Lange et al. | |
| 2003/0060938 | A1 | 3/2003 | Duvall | |
| 2005/0197175 | A1 | 9/2005 | Anderson | |
| 2006/0074560 | A1 | 4/2006 | Dyer et al. | |
| 2006/0196158 | A1 | 9/2006 | Faivre et al. | |
| 2006/0200334 | A1 | 9/2006 | Faivre et al. | |
| 2007/0068238 | A1 | 3/2007 | Wendte | |
| 2007/0239337 | A1 | 10/2007 | Anderson | |
| 2008/0140431 | A1 | 6/2008 | Anderson et al. | |
| 2009/0099776 | A1 | 4/2009 | Kapadi et al. | |
| 2009/0265952 | A1 | 10/2009 | Burke et al. | |
| 2009/0311084 | A1 | 12/2009 | Coers et al. | |
| 2010/0036696 | A1 | 2/2010 | Lang et al. | |
| 2010/0319941 | A1 | 12/2010 | Peterson | |
| 2011/0153338 | A1 | 6/2011 | Anderson | |
| 2013/0046418 | A1 | 2/2013 | Anderson | |
| 2014/0257911 | A1 | 9/2014 | Anderson | |
| 2014/0263852 | A1 | 9/2014 | Walker et al. | |
| 2014/0277905 | A1 | 9/2014 | Anderson | |
| 2015/0095830 | A1 | 4/2015 | Massoumi et al. | |
| 2015/0102154 | A1 | 4/2015 | Duncan et al. | |
| 2016/0055593 | A1* | 2/2016 | Groeneveld | G06Q 40/08 705/4 |
| 2016/0073573 | A1 | 3/2016 | Ethington et al. | |
| 2016/0232621 | A1 | 8/2016 | Ethington et al. | |
| 2016/0247075 | A1 | 8/2016 | Mewes et al. | |
| 2016/0247079 | A1* | 8/2016 | Mewes | G06N 5/048 |
| 2016/0260021 | A1 | 9/2016 | Marek | |
| 2017/0192431 | A1 | 7/2017 | Foster et al. | |
| 2017/0364816 | A1* | 12/2017 | Marticorena | G06N 5/048 |
| 2018/0232674 | A1 | 8/2018 | Bilde | |
| 2019/0094834 | A1 | 3/2019 | Bramberger | |
| 2019/0129435 | A1 | 5/2019 | Madsen et al. | |
| 2020/0000006 | A1 | 1/2020 | Mcdonald et al. | |
| 2020/0093054 | A1 | 3/2020 | Aesaert et al. | |
| 2020/0134485 | A1 | 4/2020 | Sood | |
| 2020/0334518 | A1 | 10/2020 | Guan et al. | |
| 2021/0241390 | A1 | 8/2021 | Blank et al. | |
| 2023/0098028 | A1 | 3/2023 | Alcantara | |
| 2024/0220780 | A1 | 7/2024 | Connell et al. | |

FOREIGN PATENT DOCUMENTS

| | | | |
|---|---|---|---|
| CN | 204507277 | | 7/2015 |
| CN | 105205248 | | 12/2015 |
| DE | 102018120741 | | 2/2020 |
| EP | 2267566 | | 12/2010 |
| EP | 2508057 | | 10/2012 |
| EP | 2868806 | | 5/2016 |
| EP | 2868806 | A1 | 5/2016 |
| EP | 3175691 | | 6/2017 |
| GB | 1519517 | | 7/1978 |
| JP | 2017144784 | | 8/2017 |
| JP | 2018151388 | | 9/2018 |
| JP | 2019153109 | A | 9/2019 |
| RU | 2502047 | | 12/2013 |
| WO | 2016118686 | A1 | 7/2016 |
| WO | 2017077113 | | 5/2017 |
| WO | 2018086764 | | 5/2018 |
| WO | 2018220159 | | 12/2018 |

OTHER PUBLICATIONS

"Boeing unmanned helicopter landing on moving trailer," uploaded on Nov. 19, 2011. (Retrieved on Mar. 23, 2023, https://www.youtube.com/watch?v=IIBtM8V7wsM).

Ma, Y., "Coordinated Landing and Mapping with Aerial and Ground Vehicle Teams," University of Waterloo, 2012, 75 pages. (Retrieved on Mar. 23, 2023, https://uwspace.uwaterloo.ca/bitstream/handle/10012/6993/Ma_Yan.pdf?sequence=I&isAllowe d=y).

"Ground Penetrating Radar for Drone," 10 pages. (Retrieved on Mar. 23, 2023, https://integrated.ugcs.com/gpr?? utm_source=ugcs.com&utm_medium=application&utm_campa ign=redirect).

Jeffrey, C., "Nesting platform takes smart drone capabilities to new heights," Feb. 17, 2016, 12 pages. (Retrieved on Mar. 23, 2023, https://newatlas.com/dronebox-rem ote-uav-nesti ng-pl atform/41850/).

Sirén, M, et al., "Predicting forwarder rut formation on fine-grained mineral soils," Scandinavian Journal of Forest Research, Nov. 27, 2018, 11 pages. (Retrieved on Mar. 23, 2023, https://www.tandfonline.com/ doi/ pdf/10.1080/02827 581. 2018.1562567).

SA-400 Jackal Autonomous Takeoff and Landing on a Moving Trailer, uploaded on Aug. 22, 2014. (Retrieved on Mar. 29, 2023, https://www.youtube.com/watch?v=n__GBgTu3p0).

Jones, M.F, et al., "Soil Trafficability Forecasting," Open Journal of Forestry, Sep. 29, 2019, 27 pages. (Retrieved on Mar. 23, 2023, https://www.scirp.org/journal/paperinformation.aspx?paperid=95468).

Wikipedia, "Submarine aircraft carrier," 7 pages. (Retrieved on Mar. 23, 2023, https://en.wikipedia.org/wiki/ Submarine aircraft carrier).

Daly, J.M, et al., "Decentralized Control for UAV / UGV Landing," (Retrieved on Mar. 29, 2023, https://www.youtube.com/watch?v=JRjJV_WLluA).

Hoffer, T., "What is Ground Penetrating Radar (GPR) & How Does it Work?," Feb. 13, 2023, 14 pages. (Retrieved on Mar. 23, 2023, https://www.sensoft.ca/b log/what-is-gpr).

Meng et al., "Predicting optimal soybean harvesting dates with satellite data," Precision agriculture'13, Wageningen Academic Publishers, 2013, 8 pages.

Choi et al., "Optimal Harvest date Prediction by Integrating Past and Future Feature Variables," IEEE Asia-Pacific Conference on Computer Science and Data Engineering (CSDE), 2019, 8 pages, Melbourne, Australia.

Xu et al., "Use of remote sensing to predict the optimal harvest date of corn," Field Crops Research, Apr. 15, 2019, 13 pages, vol. 236.

Shendryk et al., "A Satellite-Based Methodology for Harvest Date Detection and Yield Prediction in Sugarcane," IGARSS 2020—2020 IEEE International Geoscience and Remote Sensing Symposium, Sep. 26, 2020-Oct. 2, 2020, 4 pages, Waikoloa, USA.

Shendryk et al., "Integrating satellite imagery and environmental data to predict field-level cane and sugar yields in Australia using machine learning," Jan. 1, 2021, vol. 260, 13 pages.

(56) References Cited

OTHER PUBLICATIONS

Oré et al., "Predicting Sugarcane Harvest Date and Productivity with a Drone-Borne Tri-Band SAR," Remote Sensing. 2022; 14(7):1734, Apr. 4, 2022, 24 pages.
English Translation of the Description for JP2019153109A (Year: 2019).
Ma, "Coordinated Landing and Mapping with Aerial and Ground Vehicle Teams," University of Waterloo, 2012, retrieved from https://uwspace.uwaterloo.ca/bitstream/handle/10012/6993/Ma_Yan.pdf?sequence=I&isAllowed=y on Mar. 23, 2023, 75 pages.
Sysu Robotics Lab, "Autonomous Takeoff, Tracking and Landing of an UAV on a Moving UGV Using Onboard Monocular Vision," YouTube, Jan. 16, 2024, retrieved from https://www. youtube.com/watch?v=lakP1 EMtl1w, 3 pages.
United States Patent and Trademark Office, "Final Office Action," issued in connection with U.S. Appl. No. 18/531,409, dated Apr. 8, 2026, 20 pages.

* cited by examiner

| USER | DATE | LOCATION | WEATHER METRIC | FIELD METRIC | FIELD CONDITION | FIELD ACCESS DECISION |
|---|---|---|---|---|---|---|
| USER 1 | 10/22/21 | SHANGHAI, CN | SUNNY | SOIL DRY | GOOD FIELD CONDITION | YES |
| USER 2 | 10/25/21 | MONTREAL, CA | CLOUDY | SOIL SATURATED | WAIT FOR BETTER FIELD CONDITION | YES |
| USER 3 | 11/20/21 | TOKYO, JP | SUNNY | SOIL WET | WAIT FOR BETTER FIELD CONDITION | NO |
| ... | ... | ... | ... | ... | ... | ... |

METHODS, SYSTEMS, ARTICLES OF MANUFACTURE, AND APPARATUS TO DETERMINE FIELD ACCESS READINESS

FIELD OF THE DISCLOSURE

This disclosure relates generally to field access readiness and, more particularly, to methods, systems, articles of manufacture, and apparatus to determine field access readiness.

BACKGROUND

Farming operations depend on various factors such as the time of year, season, and/or crop maturity. Farming operations are also dependent upon factors such as soil moisture, field elevation, weather, etc. Agricultural/farming machines can be restricted from full field or partial field access based on these factors.

Figure 1:
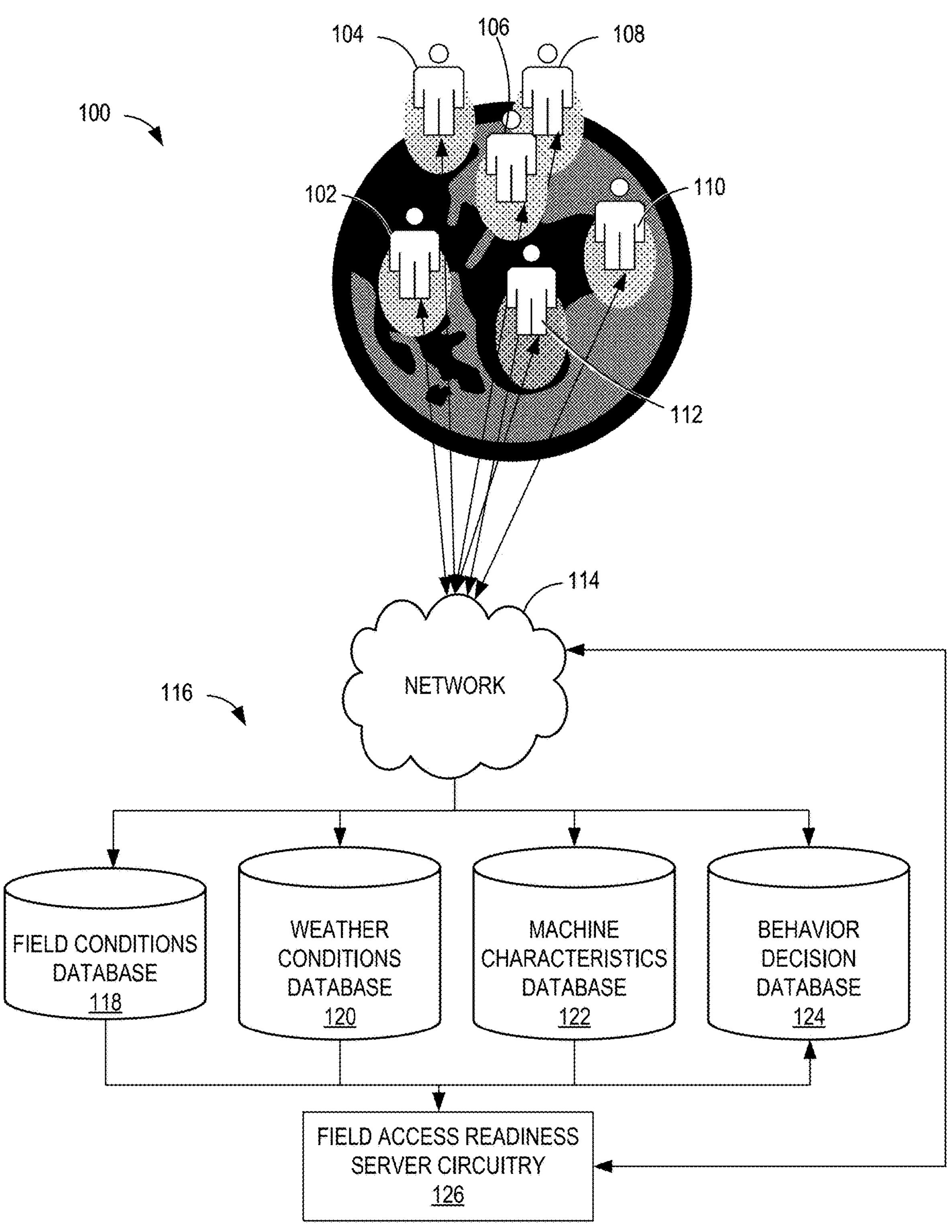
FIG. 1 is an illustration of an example environment in which a system to determine field access readiness operates.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

The timing of farming operations relative to the time of year, season, and/or crop maturity is critical to the success of high yielding agricultural systems. Timing of farming operations is affected by multiple factors such as soil moisture, field elevation, weather, etc. Agricultural machines can be restricted from access to a full field or portions of a field affected by these factors. Because predicting field access readiness and planning agricultural machine movement from field to field requires financial and/or effort investments, farming market participants (farmers, machine operators, etc.) have an interest to determine field access readiness to capitalize on timing, amount of work, asset management, and overall asset capacity.

To predict field access readiness and plan agricultural machine movement, farming market participants usually rely on their own past experiences, weather predictions, or experiences from farming market participants they know of. The estimation and prediction of when to access a field, what machine to use, and when to use the machine on the field leads to inaccuracies that have an effort and financial impact. For example, farming market participants may predict, using their own judgement, that a field is ready to be accessed. However, due to the soil being too wet, the farming market participant ineffectively accessed the field and used a machine on it. Improper decisions on accessing a field are being made all over the world. Along with the decision to access a field, data such as soil properties and weather conditions is being gathered by farming market participants globally. The gathering of pertinent data including historical field access decisions made by other farming market participants from different locations around the world can be used by another farming market participant to determine a more accurate probability that a field may be accessed by using artificial intelligence.

Unlike traditional techniques of predicting field access readiness and planning for machines, examples disclosed herein streamline the field access readiness determination, generate machine plans, and communicate the machine plans to machines to deploy and execute work. By using a behavioral decision database which hosts historical field access decisions and related data from farming market participants from around the globe and assessing weather metrics, field metrics, and machine characteristics, a more accurate probability that a field may be accessed and machine plans are obtained, maximizing and planning how/when to do work in a field based on multiple factors.

FIG. 1 is an illustration of an example environment 100 in which a system to determine field access readiness operates. In the illustrated example of FIG. 1, the environment 100 includes example farming market participants 102, 104, 106, 108, 110, and 112 (farmers, machine operators, etc.), an example network 114 (e.g., a cloud, etc.), an example environment 116 including an example field conditions database 118, an example weather conditions database 120, an example machine characteristics database 122, and an example behavior decision database 124, and an example field access readiness server circuitry 126. The environment 100 including the example farming market participants 102, 104, 106, 108, 110, and 112 are communicatively connected and have access to the example network 114 via network-connected devices (e.g., a mobile device, a tablet, etc.). The example network 114 is communicatively connected to the example farming market participants 102, 104, 106, 108, 110, and 112 and the example environment 116 including the example field conditions database 118, the example weather conditions database 120, the example machine characteristics database 122, and the example behavior decision database 124. The example network 114 is also communicatively connected to the example field access readiness server circuitry 126. The example environment 116 including the example field conditions database 118, the example weather conditions database 120, the example machine characteristics database 122, and the example behavior decision database 124 is communicatively connected to the example field access readiness server circuitry 126 and the example network 114. The example field access readiness server circuitry 126 is communicatively connected to the example network 114 and the example environment 116 including the example field conditions database 118, the example weather conditions database 120, the example machine characteristics database 122, and the example behavior decision database 124.

As shown in FIG. 1, the example farming market participants 102, 104, 106, 108, 110, and 112 are farmers, machine operators, or any participant in the farming market. The example farming market participants 102, 104, 106, 108, 110, and 112 are located in different regions of the world with different field metrics, weather metrics, machine characteristics, and/or historical behavior decisions. The example farming market participants 102, 104, 106, 108, 110, and 112 send, to the example network 114 via a network-connected device, data including, but not limited to, a field metric, a weather metric, a machine characteristic, and/or a historical behavior decision. The example farming market participants 102, 104, 106, 108, 110, and 112 can request the example network 114 via a network-connected device to obtain, from the example field access readiness server circuitry 126, data including, but not limited to, a field readiness probability, a field readiness map, and/or machine plans. In some examples, the example farming market participants 102, 104, 106, 108, 110, and 112 can request the example network 114 via a network-connected device to have the example field access readiness server circuitry 126 to use data from the example behavioral decision database 124 to generate data including, but not limited to, a field readiness probability, a field readiness map, and/or machine plans. Furthermore, the example farming market participants 102, 104, 106, 108, 110, and 112 have access to the example network 114 via a network-connected device to obtain data, sent from the field access readiness server circuitry 126, including, but not limited to, a field readiness probability, a field readiness map, and/or machine plans.

In the example of FIG. 1, the example network 114 is a cloud or similar device. The example network 114 retrieves, receives and/or otherwise obtains, from the example farming market participants 102, 104, 106, 108, 110, and 112, requests to obtain, from the example field access readiness server circuitry 126, data including, but not limited to, a field readiness probability, a field readiness map, and/or machine plans. The example network 114 retrieves, receives and/or otherwise obtains, from the example farming market participants 102, 104, 106, 108, 110, and 112, data including, but not limited to, a field metric, a weather metric, a machine characteristic, and/or a historical behavior decision. The example network 114 sends the data, from the example farming market participants 102, 104, 106, 108, 110, and 112, to the example field conditions database 118, the example weather conditions database 120, the example machine characteristics database 122, and/or the example behavior decision database 124. Furthermore, the example network 114 retrieves, receives and/or otherwise obtains, from the example field access readiness server circuitry 126, data including, but not limited to, a field readiness probability, a field readiness map, and/or machine plans. The example network 114 communicates, to the example farming market participants 102, 104, 106, 108, 110, and 112, data, from the example field access readiness server circuitry 126, including, but not limited to, a field readiness probability, a field readiness map, and/or machine plans. In some examples, the example farming market participants 102, 104, 106, 108, 110, and 112 may request the example network 114 to obtain, from the example field access readiness server 126, data including, but not limited to, a field readiness and/or machine plan based on data in the example behavior decision database 124.

In the example of FIG. 1, the example field conditions database 118 is a data source that stores data corresponding to field metrics from the example network 114 to be retrieved, received and/or otherwise obtained by the example field access readiness server circuitry 126.

In the example of FIG. 1, the example weather conditions database 120 is a data source that stores data corresponding to weather metrics from the example network 114 to be retrieved, received and/or otherwise obtained by the example field access readiness server circuitry 126.

In the example of FIG. 1, the example machine characteristics database 122 is a data source that stores data corresponding to machine characteristics from the example network 114 to be retrieved, received and/or otherwise obtained by the example field access readiness server circuitry 126.

In the example of FIG. 1, the example behavior decision database 124 is a data source that stores data corresponding to historical field access decisions from the example network 114 to be retrieved, received and/or otherwise obtained by the example field access readiness server circuitry 126. In some examples, a historical field access decision may be inputted by the example field access readiness server circuitry 126 into the example behavior decision database 124. In some examples, data from the example behavior decision database 124 may be used by the field access server circuitry 126 if no additional data is inputted by the example farming market participants 102, 104, 106, 108, 110, and 112. The data stored in the example behavior decision database 124 is illustrated in more detail below.

While the illustrated example of FIG. 1 includes the aforementioned databases (e.g., data sources), examples disclosed herein are not limited thereto. In some examples, the aforementioned databases and/or data from such databases can be aggregations of other databases.

In the example of FIG. 1, the example field access readiness server circuitry 126 is a server circuitry that determines field access readiness. The example field access readiness server circuitry 126 includes an example neural network trainer circuitry 310, an example data retrieval circuitry 312, an example field condition generator circuitry 314, an example probability generator circuitry 316, an example map generator circuitry 318, an example machine plan generator circuitry 320, an example machine plan communication circuitry 322, and an example data storage circuitry 324 which will be illustrated in more detail below. The example field access readiness server circuitry 126 retrieves, receives and/or otherwise obtains data from the example field conditions database 118, the example weather conditions database 120, the example machine characteristics database 122, and/or the example behavior decision database 124. From there, a field condition, a probability that a field may be accessed, and a field readiness map is generated by the example field access readiness server circuitry 126. In some examples, the example field access readiness server circuitry 126 generates a machine plan and/or communicates the machine plan to a machine. The example field access readiness server circuitry 126 outputs a probability that a field may be accessed, a field readiness map, and/or a machine plan. The example field access readiness server circuitry 126 sends the probability that a field may be accessed, a field readiness map, and/or machine plan to the example network 114. In some examples, the example field access readiness server circuitry retrieves, receives and/or otherwise obtains requests from the example farming market participants 102, 104, 106, 108, 110, and 112 via the example network 114 to generate the probability that a field may be accessed, a field readiness map, and/or a machine plan based on the example behavior decision database 124 if no additional data is inputted by the example farming market participants 102, 104, 106, 108, 110, and 112. In some examples, the example field access readiness server circuitry 126 may request a field access decision and related data from the example farming market participants 102, 104, 106, 108, 110, and 112 via the example network 114 if a decision to access a field was made. Subsequently in some examples, the example field access readiness server circuitry 126 may store a historical field access decision and related data in the example behavior decision database 124.

In operation, in FIG. 1 illustrated how example farming market participants 102, 104, 106, 108, 110, and 112 from around the world can obtain field access readiness data, including, but not limited to, a probability that a field may be accessed, a field readiness map, and/or a machine plan based on the example field conditions database 118, the example weather conditions database 120, the example machine characteristics database 122, and the example behavior decision database 124. The example farming market participants 102, 104, 106, 108, 110, and 112 request the example network 114 for the example field access readiness server circuitry 126 to generate a probability that a field may be accessed, a field readiness map, and/or a machine plan. The example farming market participants 102, 104, 106, 108, 110, and 112 send, to the example network 114 via a network-connected device, data including, but not limited to, a field metric, a weather metric, a machine characteristic, and/or a historical behavior decision. The example network 114 retrieves, receives and/or otherwise obtains, from the example farming market participants 102, 104, 106, 108, 110, and 112, data including, but not limited to, a field metric, a weather metric, a machine characteristic, and/or a historical behavior decision. The example network 114 sends the data, from the example farming market participants 102, 104, 106, 108, 110, and 112, to the example field conditions database 118, the example weather conditions database 120, the example machine characteristics database 122, and/or the example behavior decision database 124. The example field access readiness server circuitry 126 retrieves, receives and/or otherwise obtains data from the example field conditions database 118, the example weather conditions database 120, the example machine characteristics database 122, and/or the example behavior decision database 124. From there, a field condition, a probability that a field may be accessed, and a field readiness map is generated by the example field access readiness server circuitry 126. In some examples, the example field access readiness server circuitry 126 generates a machine plan and/or communicates the machine plan to a machine. The example field access readiness server circuitry 126 outputs a probability that a field may be accessed, a field readiness map, and/or a machine plan. The example field access readiness server circuitry 126 sends the probability that a field may be accessed, a field readiness map, and/or machine plan to the example network 114. The example network 114 communicates, to the example farming market participants 102, 104, 106, 108, 110, and 112, data, from the example field access readiness server circuitry 126, including, but not limited to, a field readiness probability, a field readiness map, and/or machine plans. In some examples, the example field access readiness server circuitry retrieves, receives and/or otherwise obtains requests from the example farming market participants 102, 104, 106, 108, 110, and 112 via the example network 114 to generate the probability that a field may be accessed, a field readiness map, and/or a machine plan based on the example behavior decision database 124 if no additional data is inputted by the example farming market participants 102, 104, 106, 108, 110, and 112. In some examples, the example field access readiness server circuitry 126 may request a field access decision and related data from the example farming market participants 102, 104, 106, 108, 110, and 112 via the example network 114 if a decision to access a field was made. Subsequently in some examples, the example field access readiness server circuitry 126 may store a historical field access decision and related data in the example behavior decision database 124.

While examples disclosed herein consider a use case scenario of determining field access readiness using the example field conditions database 118, the example weather conditions database 120, the example machine characteristics database 122, and/or the example behavior decision database 124, such examples disclosed herein are not limited to that use case scenario.

Figure 2A:
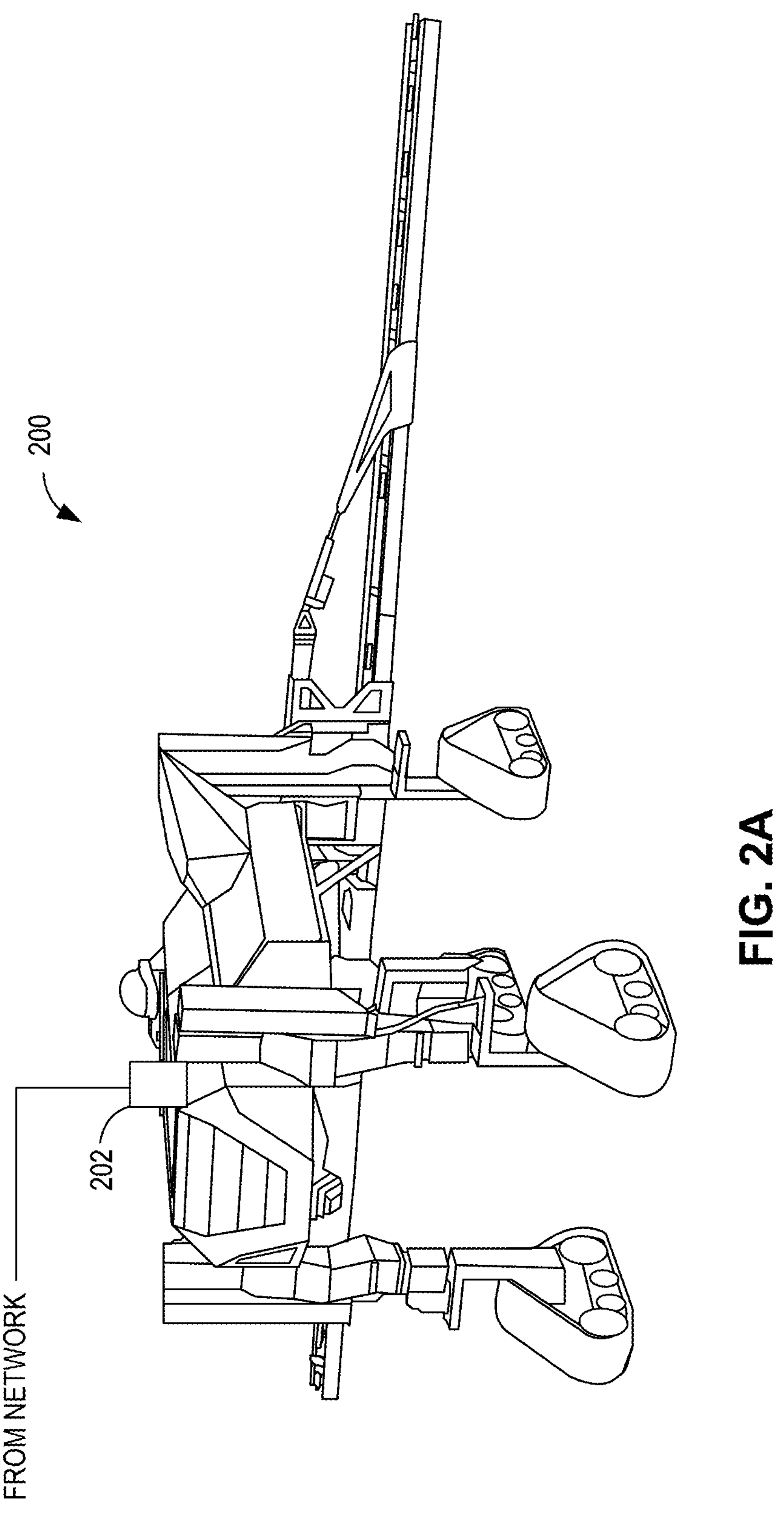
FIG. 2A is an illustration of a first example machine that may be utilized in the example of FIG. 1.

FIG. 2A is an illustration of a first example machine that may be utilized in the example of FIG. 1. FIG. 2A includes an example first machine (e.g., vehicle, tractor, etc.) 200 and an example first machine plan 202. The example first machine 200 is a machine such as a tractor that receives instructions or a machine plan, from the example machine plan communication circuitry 322 within the example field access readiness server circuitry 126, to execute work on a field and executes work on the field. The example first machine plan 202 includes instructions for a machine to execute work on a field at a given time. For example, in FIG. 2A, the example first machine 200 receives an example first machine plan 202 that includes when the example first machine 200 is to execute work on a field. In operation, the example first machine 200 receives an example first machine plan 202 from the example machine plan communication circuitry 322 to execute work on a field at a given time.

Figure 2B:
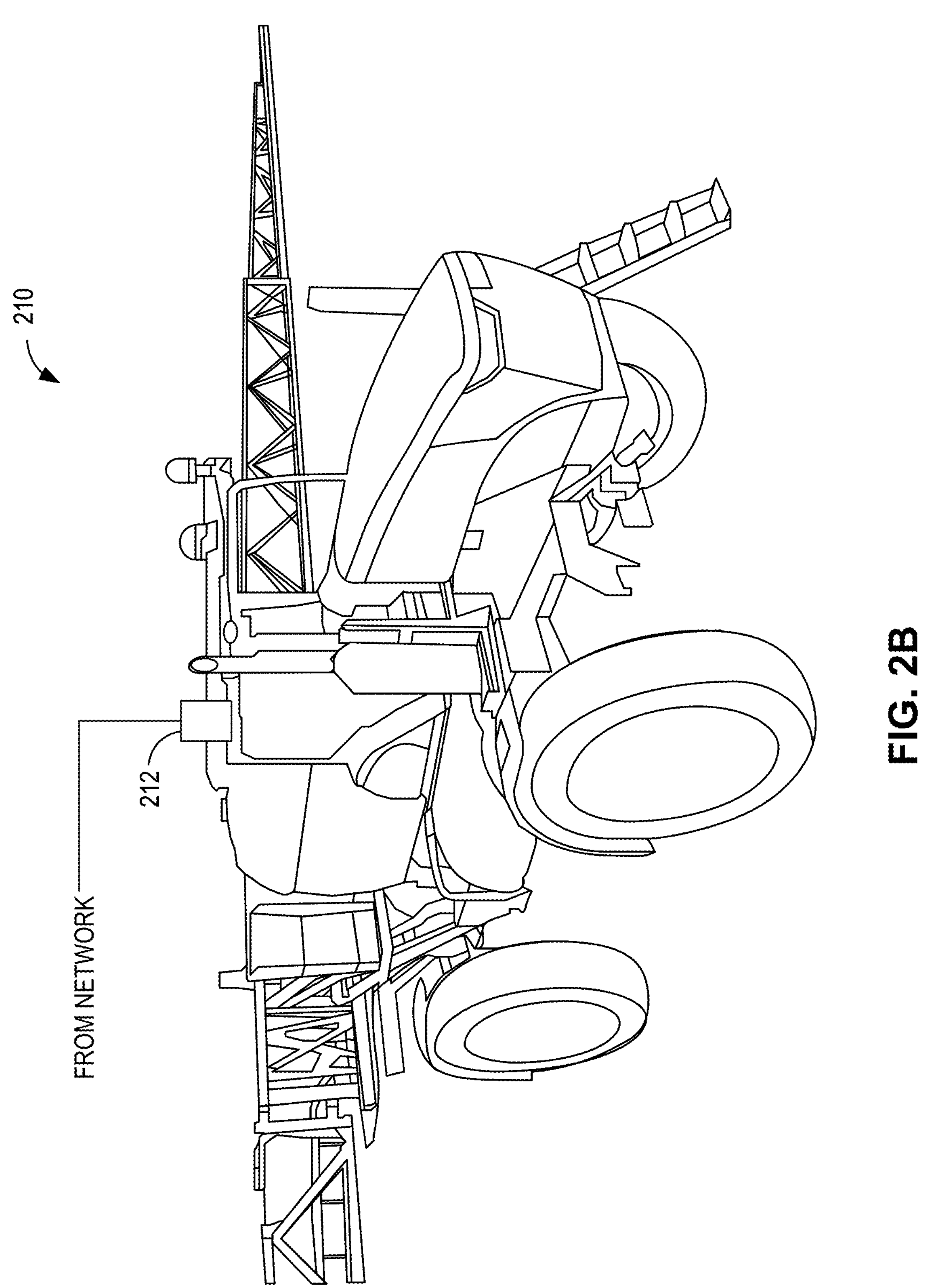
FIG. 2B is an illustration of a second example machine that may be utilized in the example of FIG. 1.

Similarly, FIG. 2B is an illustration of a second example machine that may be utilized in the example of FIG. 1. FIG. 2B includes an example first machine (e.g., vehicle, tractor, etc.) 210 and an example first machine plan 212. The example first machine 210 is a machine such as a tractor that receives instructions or a machine plan, from the example machine plan communication circuitry 322 within the example field access readiness server circuitry 126, to execute work on a field and executes work on the field. The example first machine plan 212 includes instructions for a machine to execute work on a field at a given time. For example, in FIG. 2A, the example first machine 210 receives an example first machine plan 212 that includes when the example first machine 210 is to execute work on a field. In operation, the example first machine 210 receives an example first machine plan 212 from the example machine plan communication circuitry 322 to execute work on a field at a given time.

Figure 2C:
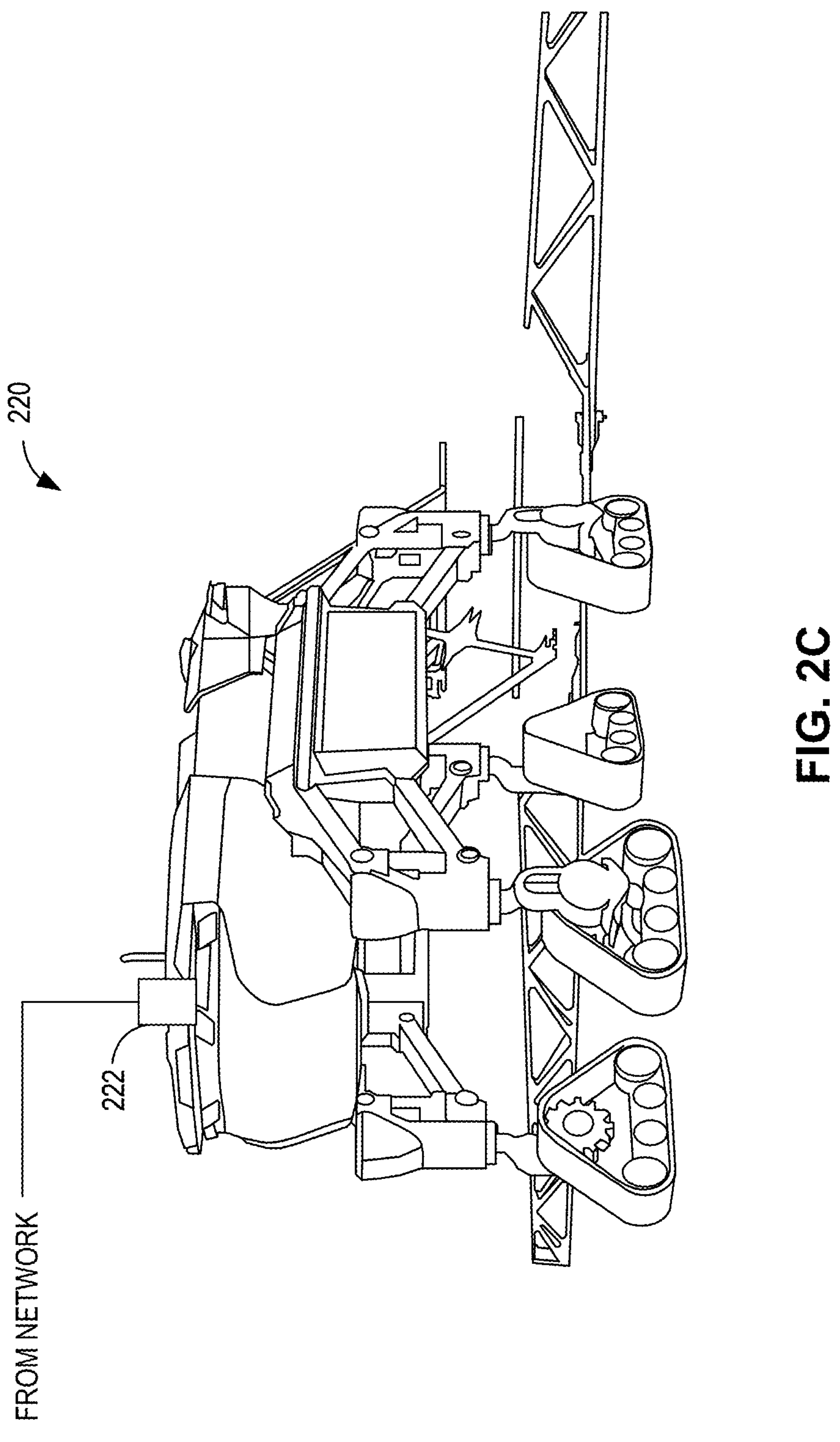
FIG. 2C is an illustration of a third example machine that may be utilized in the example of FIG. 1.

FIG. 2C is an illustration of a third example machine that may be utilized in the example of FIG. 1. FIG. 2C includes an example first machine (e.g., vehicle, tractor, etc.) 220 and an example first machine plan 222. The example first machine 220 is a machine such as a tractor that receives instructions or a machine plan, from the example machine plan communication circuitry 322 within the example field access readiness server circuitry 126, to execute work on a field and executes work on the field. The example first machine plan 222 includes instructions for a machine to execute work on a field at a given time. For example, in FIG. 2A, the example first machine 220 receives an example first machine plan 222 that includes when the example first machine 220 is to execute work on a field. In operation, the example first machine 220 receives an example first machine plan 222 from the example machine plan communication circuitry 322 to execute work on a field at a given time.

Figure 3:
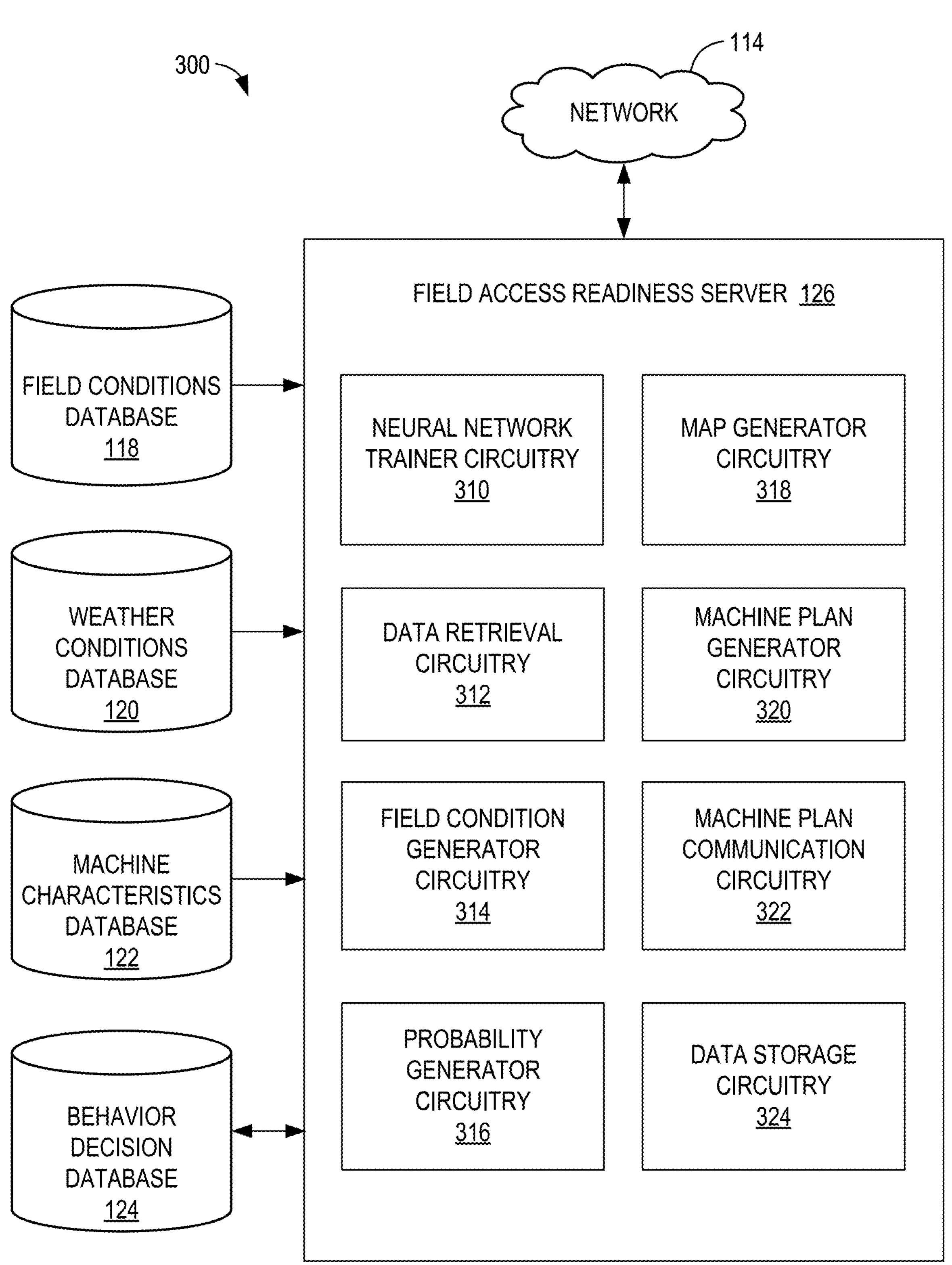
FIG. 3 is a block diagram showing additional detail of an example of the field access readiness server circuitry of FIG. 1.

FIG. 3 illustrates additional detail of the example field access readiness server circuitry 126 of FIG. 1. In the illustrated example of FIG. 3, the example environment 300 includes the example field conditions database 118, the example weather conditions database 120, the example machine characteristics database 122, the example behavior decision database 124, the example network 114, and the example field access readiness server circuitry 126 including the example neural network trainer circuitry 310, the example data retrieval circuitry 312, the example field condition generator circuitry 314, the example probability generator circuitry 316, the example map generator circuitry 318, the example machine plan generator circuitry 320, the example machine plan communication circuitry 322, and the example data storage circuitry 324. In operation, and as described in further detail below, the example neural network trainer circuitry 310 trains the neural network, the example data retrieval circuitry 312 retrieves, receives and/or otherwise obtains input data, the example field condition generator circuitry 314 generates a field condition, the example probability generator circuitry 316 generates a probability that a field may be accessed, the example map generator circuitry 318 generates a field readiness map, the example machine plan generator circuitry 320 generates a machine plan for the field, the example machine plan communication circuitry 322 communicates the machine plan to a machine, and the example data storage circuitry 324 stores a field access decision.

As described above, FIG. 3 is a block diagram of the example field access readiness server circuitry 126 to do field access readiness determination. The example field access readiness server circuitry 126 of FIGS. 1 and 3 may be instantiated (e.g., creating an instance of, bring into being for any length of time, materialize, implement, etc.) by processor circuitry such as a central processing unit executing instructions. Additionally or alternatively, the example field access readiness server circuitry 126 of FIGS. 1 and 3 may be instantiated (e.g., creating an instance of, bring into being for any length of time, materialize, implement, etc.) by an ASIC or an FPGA structured to perform operations corresponding to the instructions. It should be understood that some or all of the circuitry of FIGS. 1 and 3 may, thus, be instantiated at the same or different times. Some or all of the circuitry may be instantiated, for example, in one or more threads executing concurrently on hardware and/or in series on hardware. Moreover, in some examples, some or all of the circuitry of FIGS. 1 and 3 may be implemented by microprocessor circuitry executing instructions to implement one or more virtual machines and/or containers.

Figure 7:
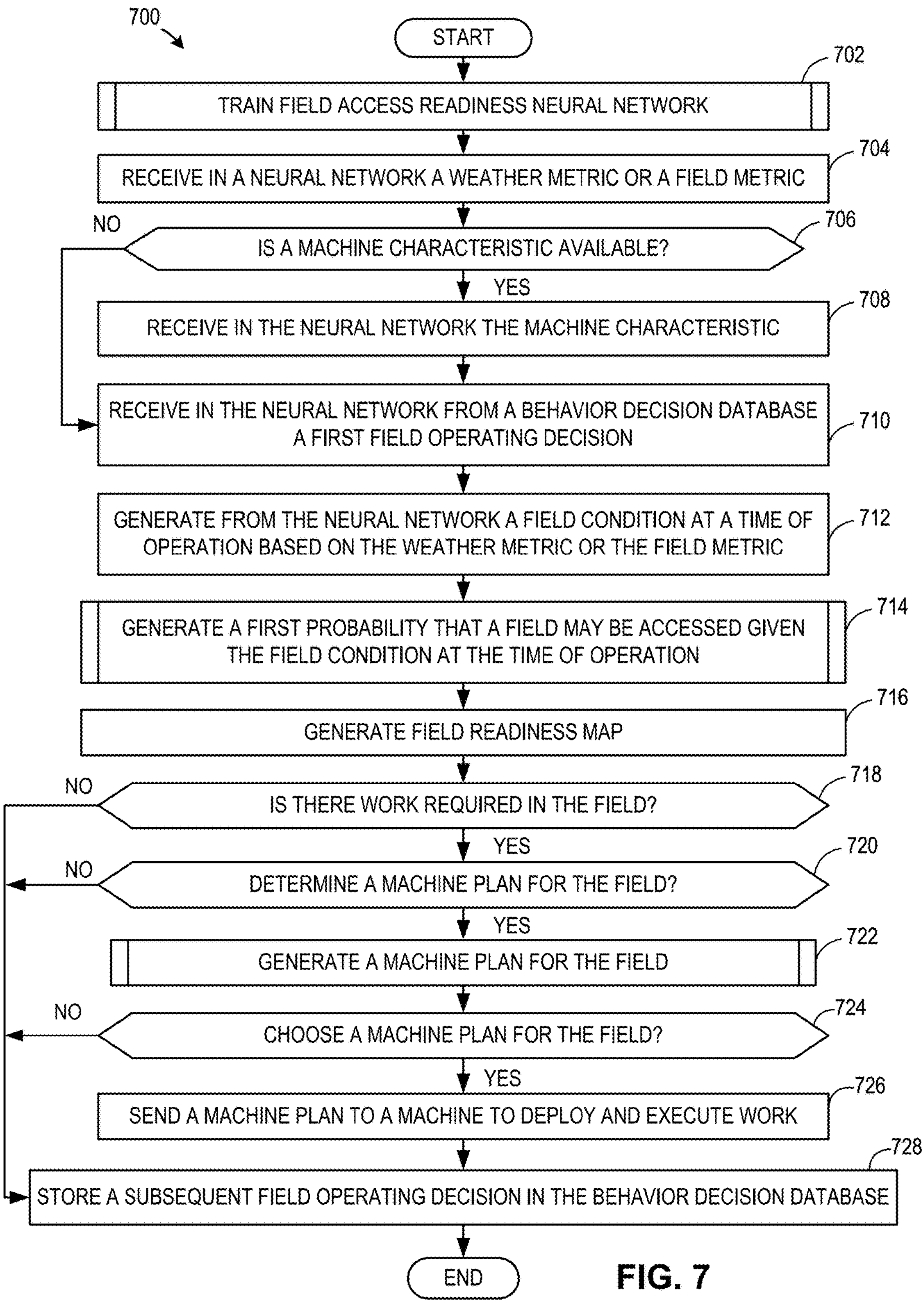
FIG. 7 is a flowchart representative of example machine readable instructions and/or example operations that may be executed by example processor circuitry to implement the field access readiness server circuitry of FIG. 3.
Figure 8:
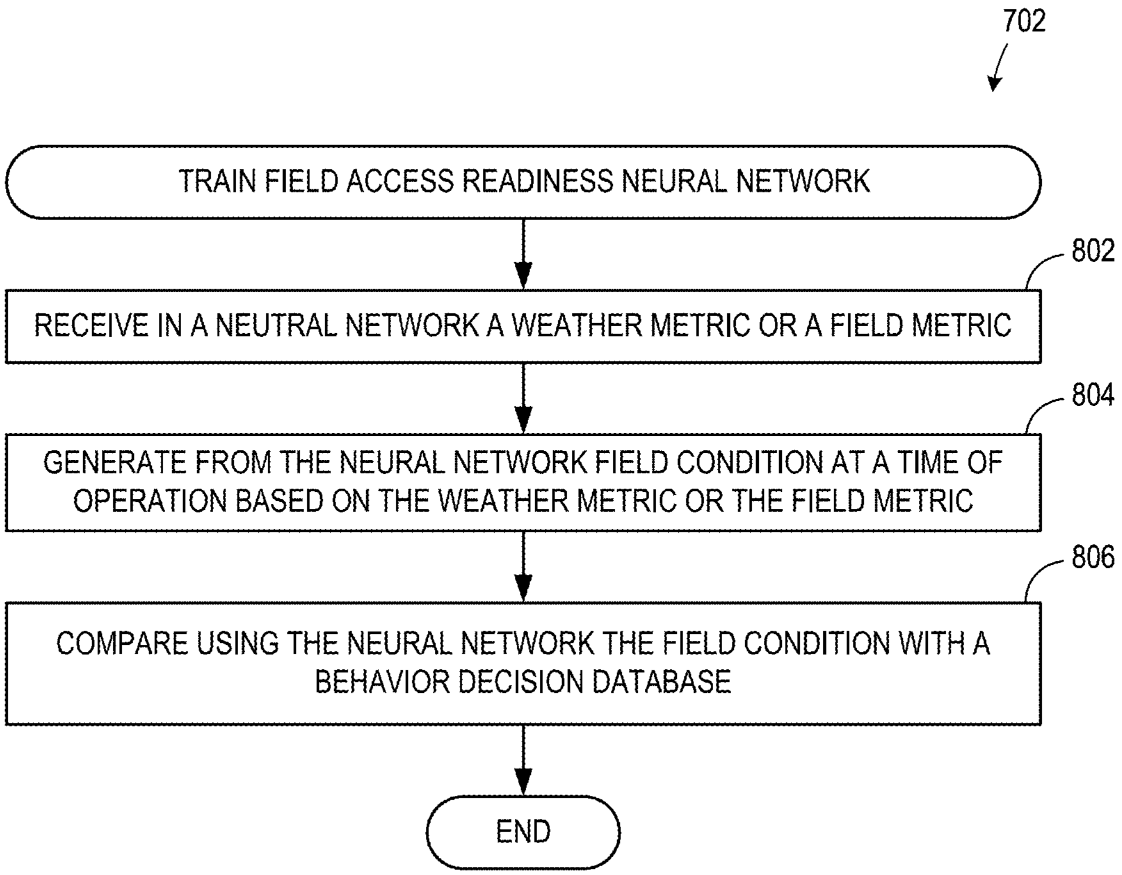
FIG. 8 is a flowchart representative of example machine readable instructions and/or example operations that may be executed by example processor circuitry to implement the field access readiness server circuitry of FIG. 3.

In some examples, the example neural network trainer circuitry 310 is instantiated by processor circuitry executing neural network trainer instructions and/or configured to perform operations such as those represented by the flowcharts of FIGS. 7 and 8. In some examples, the example data retrieval circuitry 312 is instantiated by processor circuitry executing data retrieval instructions and/or configured to perform operations such as those represented by the flowchart of FIG. 7. In some examples, the example field condition generator circuitry 314 is instantiated by processor circuitry executing field condition generator instructions and/or configured to perform operations such as those represented by the flowchart of FIG. 7. In some examples, the example probability generator circuitry 316 is instantiated by processor circuitry executing probability generator instructions and/or configured to perform operations such as those represented by the flowcharts of FIGS. 7 and 9. In some examples, the example map generator circuitry 318 is instantiated by processor circuitry executing map generator instructions and/or configured to perform operations such as those represented by the flowchart of FIG. 7. In some examples, the example machine plan generator circuitry 320 is instantiated by processor circuitry executing machine plan generator instructions and/or configured to perform operations such as those represented by the flowcharts of FIGS. 7 and 10. In some examples, the example machine plan communication circuitry 322 is instantiated by processor circuitry executing machine plan communication instructions and/or configured to perform operations such as those represented by the flowchart of FIG. 7. In some examples, the example data storage circuitry 324 is instantiated by processor circuitry executing data storage instructions and/or configured to perform operations such as those represented by the flowchart of FIG. 7.

Figure 5:
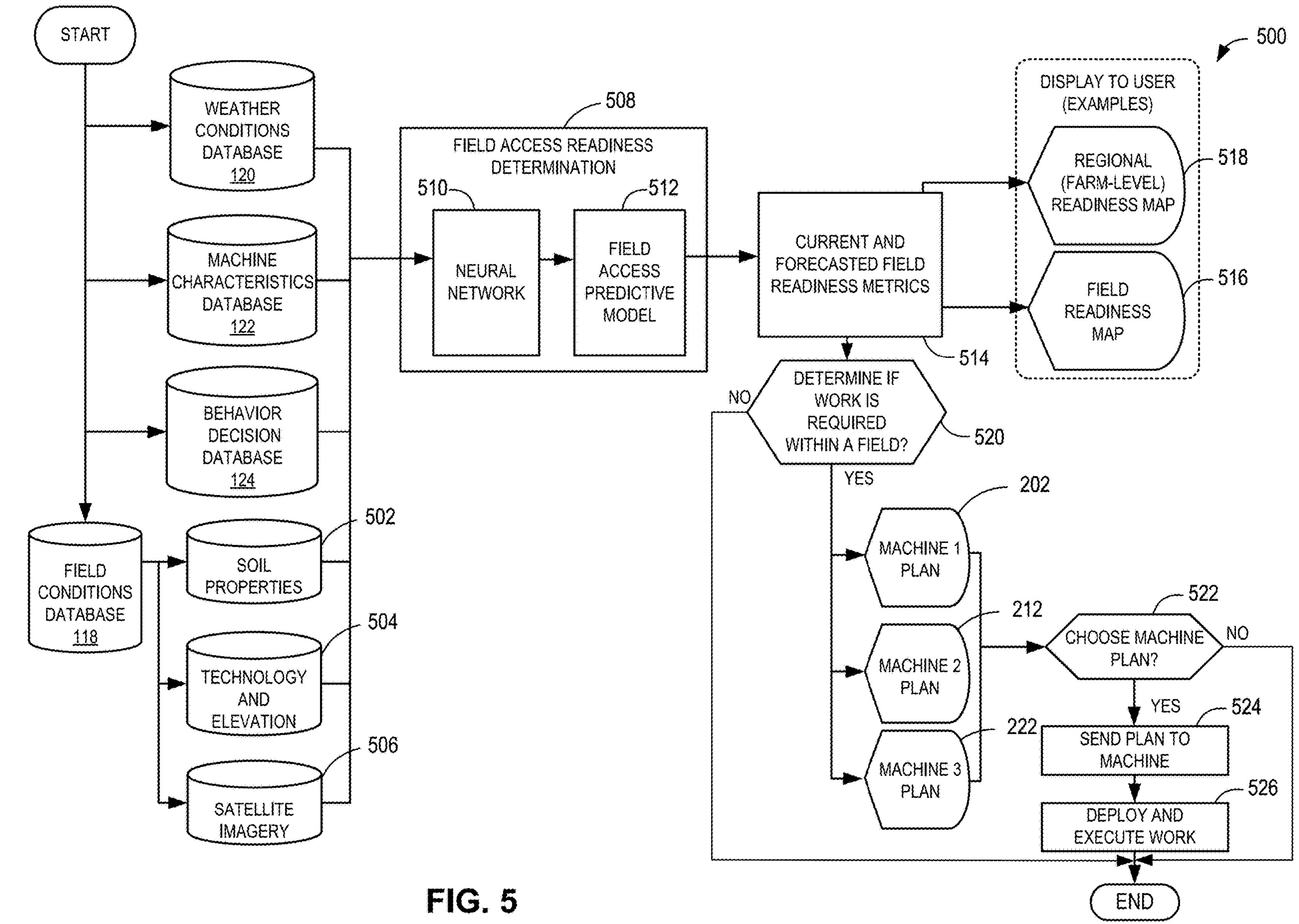
FIG. 5 is an illustration showing example information flow and operation of the example field access readiness server circuitry of FIGS. 1 and 3.

Returning to the illustrated example of FIG. 3, in operation the example neural network trainer circuitry 310 trains the neural network. To utilize the example field access readiness server circuitry 126, the neural network is initially trained by the neural network trainer circuitry 310. The example farming market participants 102, 104, 106, 108, 110, and 112, via the example network 114, input a field metric and/or a weather metric. The example network 114 sends the field metric and/or weather metric into the example field conditions database 118 and the example weather conditions database 120, respectively. A weather metric is the weather (sunny, cloudy, rainy, etc.) at a time a farming market participant would like to access a field. The weather metric may be for a current time or a future time. A field metric represents how the field state (dry, wet, saturated, etc.) is at a time a farming market participant would like to access a field. The field metric may be for a current time or a future time. In some examples and as shown in FIG. 5 which is illustrated in more detail below, the field metric may be represented by, but not limited to, soil properties, using technology for field elevation, and/or using satellite imagery of the field. The field metric and/or the weather metric is received by a neural network from the example field conditions database 118 and/or the example weather conditions database 120. The neural network is a subset of artificial intelligence and machine learning used to train a model. In FIG. 3, the neural network train the example field access readiness server circuitry 126 for operation.

After the neural network receives the field metric and/or weather metric, the example neural network trainer circuitry 310 generates a field condition at a time of operation based on the weather metric and/or the field metric. The field condition is the condition a field is in for a farming market participant to access. For example, a field condition may be represented as good field condition or wait for better field condition. The field condition is based on the field metric and/or weather metric inputted by a farming market participant.

Figure 4:
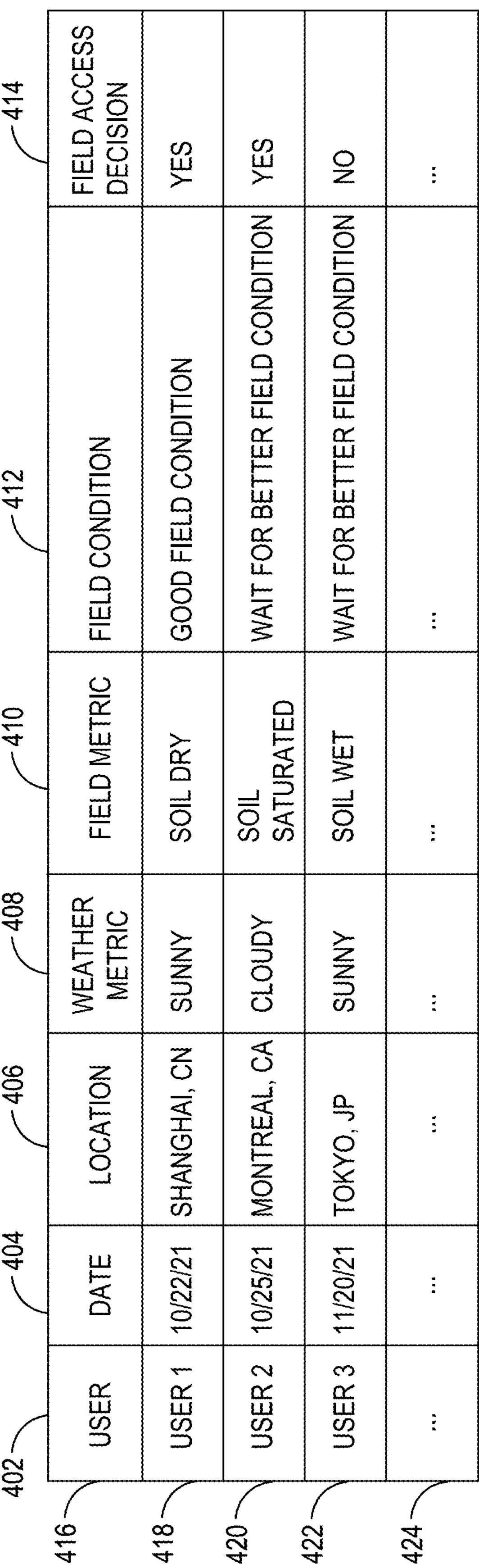
FIG. 4 is an illustration of an example of the behavior decision database of FIG. 1.

To train the neural network to generate accurate predictions, the field condition generated by the example neural network trainer circuitry 310 is compared to a decision in the example behavior decision database 124. The accuracy of a field condition is compared with a field condition associated with a historical field access decision made by a farming market participant. FIG. 4, which will be discussed in more detail below, illustrated an example behavior decision database 124. As shown in FIG. 4, a decision by a first user has an associated field condition of "Good Field Condition". If a field condition generated by the example neural network trainer circuitry 310 is an accurate representation compared to a field condition in the example behavior decision database 124 which utilizes a field metric and/or a weather metric from a farming market participant, then no adjustment is required in the neural network. If the field condition generated by the example neural network trainer circuitry 310 is not an accurate representation compared to a field condition in the example behavior decision database 124, then the example neural network trainer circuitry 310 adjusts the field condition generated with an accurate field condition based on a field condition in the example behavior decision database 124.

After the neural network is trained to operate, the example data retrieval circuitry 312 retrieves a farmer market participant's input. A farmer market participant inputs, via the example network 114, a field metric and/or a weather metric. In some examples, a machine characteristic may be inputted by the farming market participant, if available. A machine characteristic is an element of a machine that may be used to execute work on a field. For example, a machine characteristic may be represented by an aspect, such as 400-pound tires, that a machine, such as a tractor, encompasses. The example network 114 sends the field metric and/or weather metric into the example field conditions database 118 and the example weather conditions database 120, respectively. In some examples, the example network 114 sends the machine characteristic to the example machine characteristics database 122, if available. The example data retrieval circuitry 312 retrieves, receives, or otherwise obtains the field metric and/or the weather metric from the example field conditions database 118 and/or the example weather conditions database 120. In some examples, the example data retrieval circuitry 312 retrieves, receives, or otherwise obtains the machine characteristic from the example machine characteristics database 122. The example data retrieval circuitry 312 retrieves, receives, or otherwise obtains a first field operating decision from the example behavior decision database 124. A first field operating decision is a historical field access decision or subsequent field operating decision that a farming market participant made. The historical field access decisions are stored in the example behavior decision database 124.

After the example data retrieval circuitry 312 receives, in the neural network, the first field operating decision, field metric and/or weather metric, and if available, the machine characteristic, the example field condition generator circuitry 314 generates a field condition. As discussed previously, the field condition is the condition a field is in for a farming market participant to access. For example, a field condition may be represented as good field condition or wait for better field condition. The field condition is based on the field metric and/or weather metric. The field condition is generated by the example field condition generator circuitry 314 because it is used to subsequently generate a field readiness probability.

The example probability generator circuitry 316 uses the field condition generated by the example field condition generator circuitry 314 to generate a field readiness probability. In some examples, the example probability generator circuitry 316 generates the field readiness probability in a manner consistent with example Equation 1.

$$p(B|A) = \frac{p(A|B) * p(B)}{p(A)}. \quad \text{Equation 1}$$

In the illustrated example Equation 1, p(A) represents a probability of a field condition at a time of operation, p(B) represents a marginal probability of a first field operating decision at a time of operation, p(A|B) represents a probability of a field condition at a time of operation given a first field operating decision, and p(B|A) is a probability that a field may be accessed given a field condition at a time of operation. The output of the example equation 1, p(B|A), is the field readiness probability or the first probability. p(A) represents the second probability. p(A|B) represents the third probability. In some examples, the first probability may be normalized, per Bayes Theorem, by the example probability generator circuitry 316 to account for the likelihood of typical field conditions. In other words, normalizing the first probability allows for determining how much more favorable typical operating field conditions are compared to any random field conditions, and thus score field conditions. Normalization is the last phase to generate the first probability by the example probability generator 316. Any inputs, such as a field metric, weather metric, etc., from a farming market participant are applied to the first probability to normalize the result.

Figure 6:
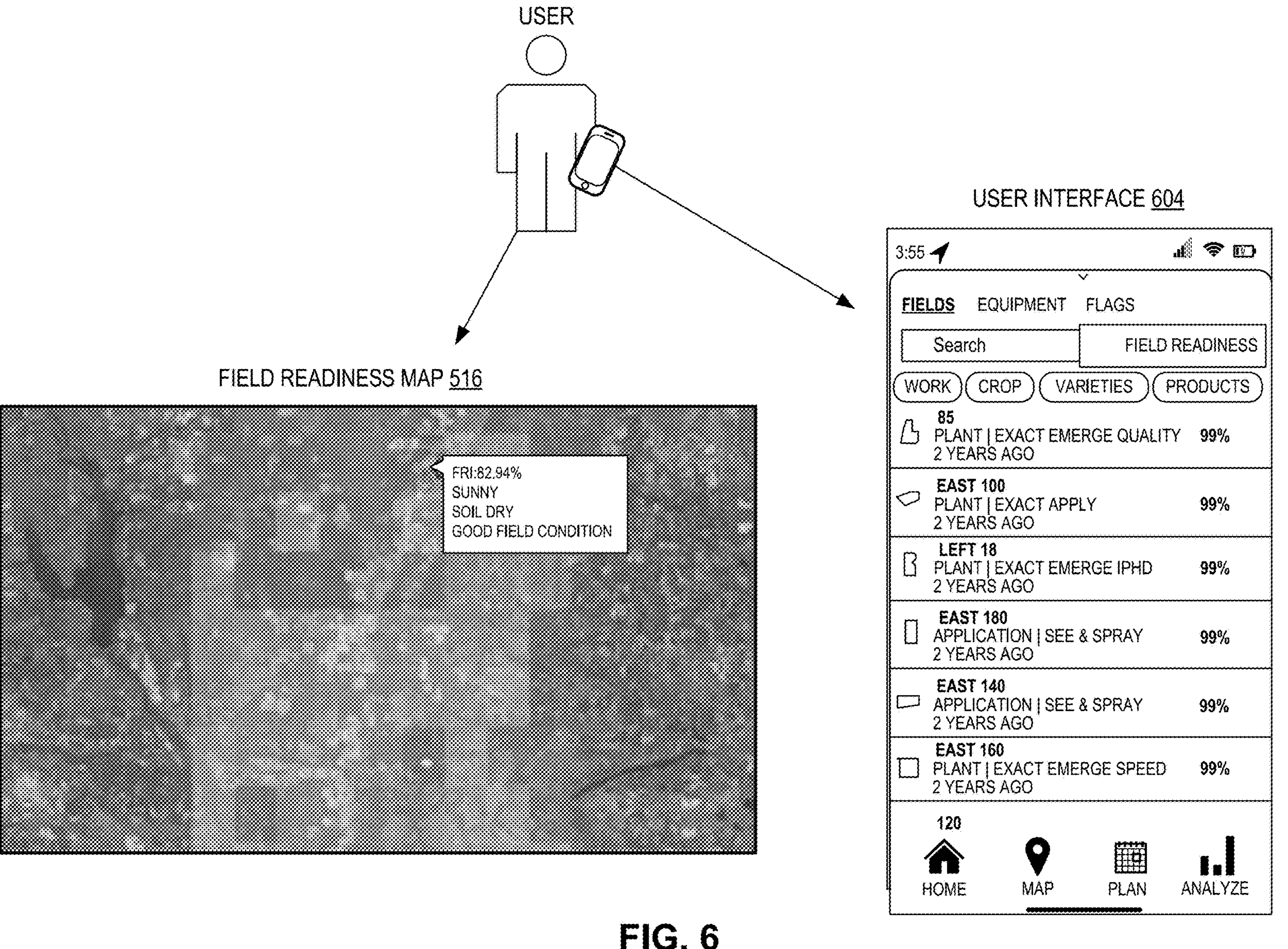
FIG. 6 is an illustration of example user interface and field readiness map that may be provided by the example operation of the example field access readiness server circuitry of FIG. 5.

A farming market participant may view the first probability on a user interface, as shown in FIG. 6. FIG. 6 is an illustration of example user interface and field readiness map that may be provided by the example operation of the example field access readiness server circuitry of FIG. 5. The user interface displays data such as, but not limited to, the first probability and other data which will be discussed further below. Furthermore, the first probability may be applied to the field, or subset areas of the field by a field metric.

Returning to FIG. 3, the example map generator circuitry 318 generates a field readiness map for the farming market participant to view on a device. The field readiness map provides the farming market participant a visual of how the field looks respective of readiness to access. An example field readiness map 516 is shown in FIG. 6. As illustrated in FIG. 6, the example field readiness map 516 displays an illustrated field visual and information, not limited to, farming market participant's inputs such as the field metric and weather metric, the field condition generated by the example field condition generator circuitry 314, and the first probability or field readiness probability generated by the example probability generator circuitry 316. In some examples, other pertinent information may be displayed on the example field readiness map 516. In some examples, the example field readiness map 516 may not display information. In some examples, the example map generator circuitry 318 generating the example field readiness map 516 is optional.

After a farming market participant knows of the probability that a field may be accessed and has a visual of the field respective of readiness, work may be required by a machine on the field. The example machine plan generator circuitry 320 generates a machine plan if work is required on the field by a machine and the farming market participant would like to determine a machine for the field. A machine plan includes, but it not limited to, the field that a machine would work on, when a machine would work on the field, and the machine that will work on the field. A machine characteristic (received by the example data retrieval circuitry 312) and the first probability (generated by the example probability generator circuitry 316) are used to generate a machine plan by the example machine plan generator circuitry 320. For instance, if a farming market participant inputted a machine characteristic of a tractor having a weight of 4500-pounds and the first probability was 98%, a machine plan specific to that machine characteristic and first probability would be generated by the example machine plan generator circuitry 320. A machine plan is viewable on the user interface as illustrated in FIG. 6. In some examples, a machine characteristic may not be available and thus, a machine plan may not be generated by the example machine plan generator circuitry 320. In some examples, multiple machine characteristics may be received by the example data retrieval circuitry 312. In some examples, multiple machine plans may be generated by the example machine plan generator circuitry 320 so that a farming market participant has options to choose from.

After a machine plan or multiple machine plans are generated by the example machine plan generator circuitry 320, a farming market participant may like to choose a machine plan for a field. As discussed previously, the machine plan(s) are viewable on a user interface as shown in FIG. 6. The example machine communication circuitry 322 determines via a farming market participant what machine plan to choose and communicated the chosen machine plan to the machine to deploy and execute work on the field. It is optional for a farming market participant to choose a machine plan. However, if a farming market participant does choose a machine plan, then the example machine communication circuitry 322 communicates to the machine in the machine plan when to do the work on the field and what field to do the work on.

At some point in time, a farming market participant may have decided to access a field given the field readiness probability, field readiness map, and/or machine plan. A farming market participant may input, into the example network 114, their historical field access decision or subsequent field operating decision which will be stored in the example behavior decision database 124 by the example data storage circuitry 324. In some examples, the example field access readiness server circuitry 126 may request a farming market participant to input a historical field access decision, if made, and related data via the example network 114 to be received by the example field access readiness server circuitry 126. Subsequently in some examples, the example data storage circuitry 324 may store a historical field access decision and related data in the example behavior decision database 124.

FIG. 4 is an illustration of an example of the behavior decision database of FIG. 1 As illustrated in FIG. 4, the example behavior decision database 124 includes an example user column 402, an example date column 404, an example location column 406, an example weather metric column 408, an example field metric column 410, an example field condition 412, and an example field access decision column 414. The example user column 402 of FIG. 4 indicates a farming market participant that accessed a field. The example data column 404 of FIG. 4 indicates a date that a farming market participant accessed a field. The example location column 406 of FIG. 4 indicates the location of the field that was accessed by a farming market participant. The example weather metric column 408 of FIG. 4 indicates the weather metric that was inputted by the farming market participant. The example field metric column 410 of FIG. 4 indicates the field metric that was inputted by the farming market participant. The example field condition column 412 of FIG. 4 indicates the field condition that was generated by the example field access readiness server circuitry 126. The example field access decision column 414 of FIG. 4 indicates the field operating decision that the farming market participant made in the past.

For instance, an example first row 416 of FIG. 4 illustrates an instance of a field access decision by a farming market participant and related data such as the date, location, weather metric, field metric, and field condition. For example, in the first row 416, a first user accessed a field, located in Shanghai, CN, on Oct. 22, 2021. As shown in the first row 416 of FIG. 4, the weather metric and field metric inputted by the first user are “Sunny” and “Soil Dry”, respectively. FIG. 4 also shows that the field condition generated by the example field access readiness server circuitry 126 was “Good Field Condition” for the first user. Additionally, the first user decided to access the field as indicated by “Yes” in the first row 416, seventh column 414. The data housed in the example behavior decision database 124 is utilized by the example field access readiness server circuitry 126 to generate a first probability that a field may be accessed given the field condition at the time of operation. The example network may send historical field access decisions to the example behavior decision database 124. In some examples, the example field access readiness server circuitry 126 can send historical field access decisions to the example behavior decision database 124. In some examples, the example behavior decision database 124 may include some or additional information related to the historical field access decisions.

FIG. 5 is an illustration showing example information flow and operation of the example field access readiness server circuitry of FIGS. 1 and 3. As shown in FIG. 5, an example information flow 500 illustrates how the example field access readiness server circuitry 126 may operate. A farmer market participant inputs a field metric and/or a weather metric. In some examples, a machine characteristic may be inputted by the farming market participant, if available. The field metric and/or weather metric are stored in the example field conditions database 118 and the example weather conditions database 120, respectively. In some examples, the machine characteristic is stored in the example machine characteristics database 122, if available.

As illustrated in FIG. 5, the example field access readiness determination 508 includes an example neural network 510 and an example field access predictive model 512. The example neural network 510 retrieves, receives, or otherwise obtains the field metric and/or the weather metric from the example field conditions database 118 and/or the example weather conditions database 120. In some examples, the example neural network 510 retrieves, receives, or otherwise obtains the machine characteristic from the example machine characteristics database 122. The example neural network 510 retrieves, receives, or otherwise obtains a first field operating decision from the example behavior decision database 124. Historical field access decisions are stored in the example behavior decision database 124.

After the example neural network 510 receives the first field operating decision, field metric and/or weather metric, and if available, the machine characteristic, the example neural network 510 generates a field condition. As discussed previously, the field condition is the condition a field is in for a farming market participant to access. The field condition is based on the field metric and/or weather metric. The output of the example neural network 510 is the field condition. The field condition is used to subsequently generate a field readiness probability by the example field access predictive model 512.

The example field access predictive model 512 receives the field condition generated by the example neural network 510 to generate a field readiness probability. In some examples, the example field access predictive model 512 generates the field readiness probability in a manner consistent with example Equation 1 above.

In operation, the example field access readiness determination 508 retrieves, receives, or otherwise obtains data via the example neural network 510, the example neural network 510 generates a field condition, the field condition is received by the example field access predictive model 512, and the example field access predictive model 512 generates a field readiness probability (output). The output of the example field access readiness determination 508 is the field readiness probability which is represented by the example current and forecasted field readiness metrics 514.

To represent the field readiness probability, the example current and forecasted field readiness metrics 514 is utilized. For instance, if a current field metric and/or weather metric were inputted by the farming market participant, then a current field readiness metric (field readiness probability) would be represented. If a forecasted or future field metric and/or weather metric were inputted by the farming market participant, then a current field readiness metric (field readiness probability) would be represented.

In addition to the field readiness probability, the example current and forecasted field readiness metrics 514 includes an example field readiness map 516. As illustrated in FIG. 6 and discussed above, the example field readiness map 516 provides the farming market participant a visual of how the field looks respective of readiness to access. In some examples, an example regional (farm-level) readiness map 518 may be generated to provide a granular view of the field.

After a farming market participant knows of the probability that a field may be accessed and has a visual of the field respective of readiness, work may be required by a machine on the field. As explained above, if work is required on the field by a machine, machine plans such as example machine 1 plan 202, example machine 2 plan 212, and/or example machine 3 plan 222 are generated based on machine characteristics that may have been inputted by the farming market participant. A machine plan includes, but it not limited to, the field that a machine would work on, when a machine would work on the field, and the machine that will work on the field. The machine plan(s) are viewable on the user interface as illustrated in FIG. 6.

After a machine plan or multiple machine plans are generated, a farming market participant may like to choose a machine plan for a field. If a farming market participant does choose a machine plan, then the chosen machine plan would be communicated or sent to the machine, associated with the chosen machine plan, to deploy and execute work on the field. In some examples, it is optional for a farming market participant to choose a machine plan.

In some examples, the example neural network trainer circuitry 310 apparatus includes means for training the neural network, the example data retrieval circuitry 312 includes means for retrieving input data, the example field condition generator circuitry 314 includes means for generating a field condition, the example probability generator circuitry 316 includes means for generating a probability that a field may be accessed, the example map generator circuitry 318 includes means for generating a field readiness map, the example machine plan generator circuitry 320 includes means for generating a machine plan for the field, the example machine plan communication circuitry 322 includes means for communicating the machine plan to a machine, and the example data storage circuitry 324 includes means for storing a field access decision.

For example, the means for training the neural network, retrieving input data, generating a field condition, generating a probability that a field may be accessed, generating a field readiness map, generating a machine plan for the field, communicating the machine plan to a machine, and storing a field access decision may be implemented by example neural network trainer circuitry 310, example data retrieval circuitry 312, example field condition generator circuitry 314, example probability generator circuitry 316, example map generator circuitry 318, example machine plan generator circuitry 320, example machine plan communication circuitry 322, and example data storage circuitry 324, respectively.

Figure 11:
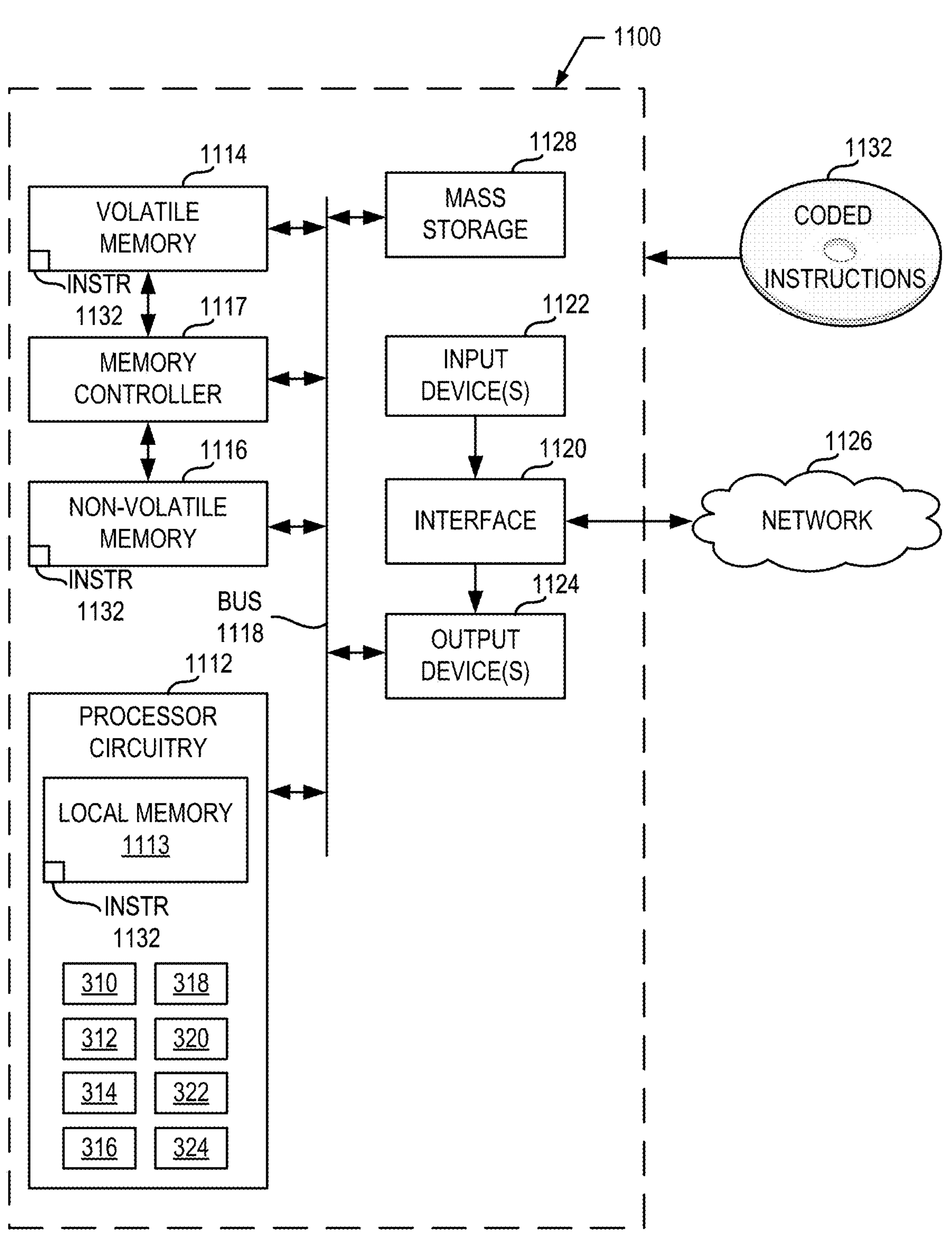
FIG. 11 is a block diagram of an example processing platform including processor circuitry structured to execute the example machine readable instructions and/or the example operations of FIGS. 7-10 to implement the field access readiness server circuitry of FIG. 3.

In some examples, the aforementioned circuitry may be instantiated by processor circuitry such as the example processor circuitry 1112 of FIG. 11. For instance, the aforementioned circuitry may be instantiated by the example microprocessor 1200 of FIG. 12 executing machine executable instructions such as those implemented by at least blocks 1402, 1404 of FIG. 14. In some examples, the aforementioned circuitry may be instantiated by hardware logic circuitry, which may be implemented by an ASIC, XPU, or the FPGA circuitry 1300 of FIG. 13 structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example field access readiness server circuitry 126 of FIG. 3 is illustrated in FIG. 3, one or more of the elements, processes, and/or devices illustrated in FIG. 3 may be combined, divided, re-arranged, omitted, eliminated, and/or implemented in any other way. Further, the example neural network trainer circuitry 310, the example data retrieval circuitry 312, the example field condition generator circuitry 314, the example probability generator circuitry 316, the example map generator circuitry 318, the example machine plan generator circuitry 320, the example machine plan communication circuitry 322, the example data storage circuitry 324 and/or, more generally, the example field access readiness server circuitry 126 of FIG. 3, may be implemented by hardware alone or by hardware in combination with software and/or firmware. Thus, for example, any of the example neural network trainer circuitry 310, the example data retrieval circuitry 312, the example field condition generator circuitry 314, the example probability generator circuitry 316, the example map generator circuitry 318, the example machine plan generator circuitry 320, the example machine plan communication circuitry 322, the example data storage circuitry 324 and/or, more generally, the example field access readiness server circuitry 126 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). Further still, the example field access readiness server circuitry 126 of FIG. 3 may include one or more elements, processes, and/or devices in addition to, or instead of, those illustrated in FIG. 3, and/or may include more than one of any or all of the illustrated elements, processes and devices.

A flowchart representative of example machine readable instructions, which may be executed to configure processor circuitry to implement the example field access readiness server circuitry 126 of FIG. 3, is shown in FIGS. 7-10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7-10, many other methods of implementing the example field access readiness server circuitry 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to determine field access readiness. The machine readable instructions and/or the operations 700 of FIG. 7 begin at block 702, at which the example neural network trainer circuitry 310 trains the field access readiness neural network. As described in further detail below, FIG. 8 illustrated an example subroutine 702 of the example machine readable instructions and/or the operations 700 of FIG. 7.

At block 704, the example data retrieval circuitry 312 retrieves, receives and/or otherwise obtains in a neural network a weather metric or a field metric from the example weather conditions database 120 or the example field conditions database 118, respectively, as illustrated in FIG. 1 (block 704).

At block 706, the example data retrieval circuitry 312 determines if a machine characteristic is available. The example data retrieval circuitry 312 proceeds to block 708 if the example data retrieval circuitry 312 determines there is a machine characteristic available (block 706). If not, the process proceeds to block 710 (block 706).

At block 708, the example data retrieval circuitry retrieves, receives and/or otherwise obtains in a neural network a machine characteristic if the example data retrieval circuitry 312 determined that a machine characteristic was available.

At block 710, the example data retrieval circuitry retrieves, receives and/or otherwise obtains in a neural network a first field operating decision from the example behavior decision database 124 as illustrated in FIG. 1.

At block 712, the example field condition generator circuitry 314 generates from the neural network a field condition at a time of operation based on the weather metric or the field metric. The field condition generated by the example field condition generator circuitry 314 is used to determine a first probability by the example probability generator circuitry 316 (block 712).

Figure 9:
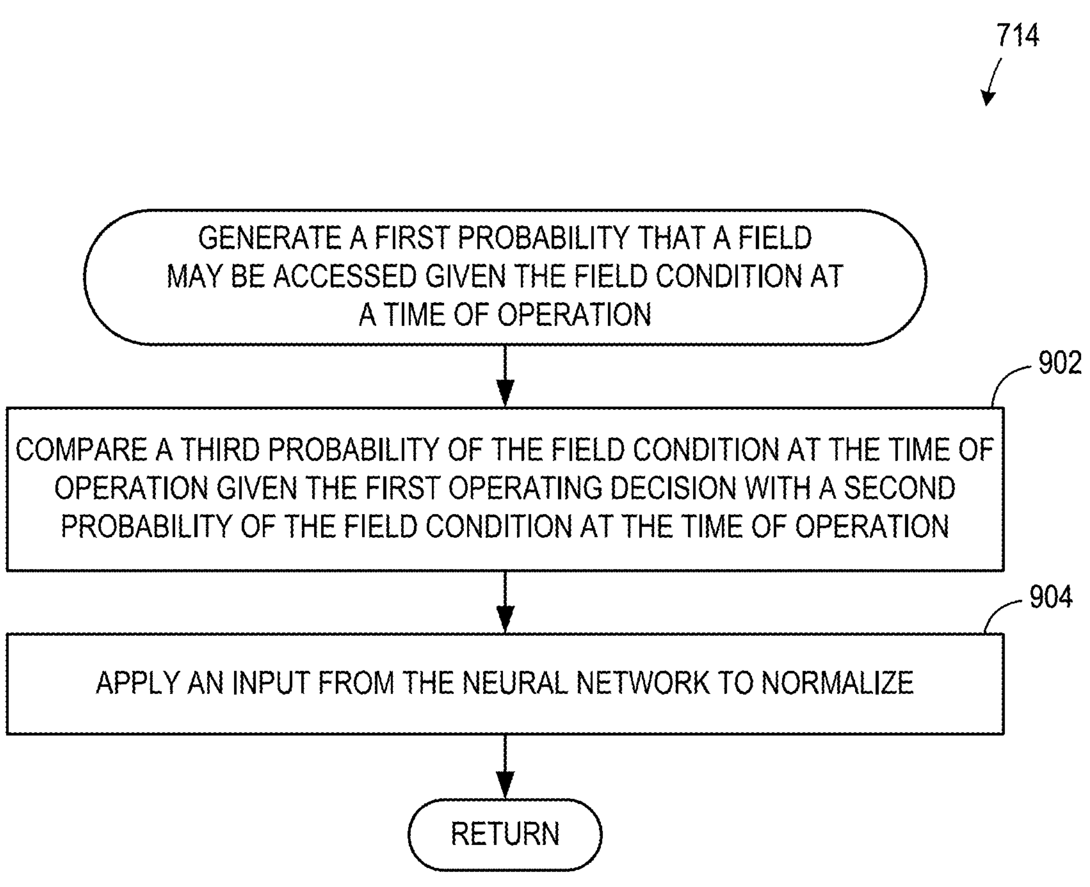
FIG. 9 is a flowchart representative of example machine readable instructions and/or example operations that may be executed by example processor circuitry to implement the field access readiness server circuitry of FIG. 3.

At block 714, the example probability generator circuitry 316 generates a first probability that a field may be accessed given the field condition at the time of operation. In some examples, the example probability generator circuitry 316 determines the first probability in a manner consistent with example Equation 1 (block 714). As described in further detail below, FIG. 9 illustrated an example subroutine 714 of the example machine readable instructions and/or the operations 700 of FIG. 7.

At block 716, the example map generator circuitry 318 generates a field readiness map. As discussed above, FIG. 6 illustrated an example field readiness map 516 (block 716).

At block 718, the example machine plan generator circuitry 320 determines if there is work required in the field. The example machine plan generator circuitry 320 proceeds to block 720 if the example machine plan generator circuitry 320 determines there is work required in the field (block 718). If not, the process proceeds to block 728 (block 718).

At block 720, the example machine plan generator circuitry 320 determines if a machine plan for the field is required. The example machine plan generator circuitry 320 proceeds to block 722 if the example machine plan generator circuitry 320 determines that a machine plan is required (block 720). If not, the process proceeds to block 728 (block 720).

Figure 10:
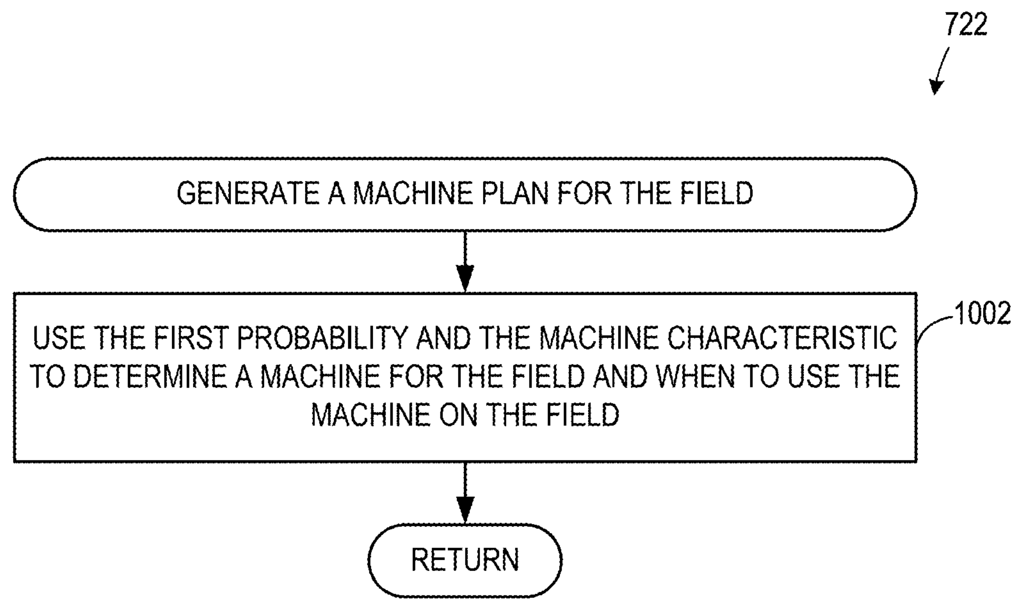
FIG. 10 is a flowchart representative of example machine readable instructions and/or example operations that may be executed by example processor circuitry to implement the field access readiness server circuitry of FIG. 3.

At block 722, the example machine plan generator circuitry 320 generates a machine plan for the field. As described above, a machine plan includes, but it not limited to, the field that a machine would work on, when a machine would work on the field, and the machine that will work on the field (block 722). As described in further detail below, FIG. 10 illustrated an example subroutine 722 of the example machine readable instructions and/or the operations 700 of FIG. 7.

At block 724, the example machine plan communication circuitry 322 determines if a machine plan for the field is to be chosen. The example machine plan communication circuitry 322 proceeds to block 726 if the example machine plan communication circuitry 322 determines that a machine plan is to be chosen (block 720). If not, the process proceeds to block 728 (block 720).

At block 726, the example machine plan communication circuitry 322 sends a machine plan to the chosen machine to deploy and execute work on the field. FIGS. 2A, 2B, and 2C illustrate this communication of machine plans to machines (block 726).

In block 728, the example data storage circuitry 324 stores a subsequent field operating decision in the example behavior decision database 324. As discussed above, FIG. 4 illustrates an example behavior decision database 124.

FIG. 8 is a flowchart representative of additional detail corresponding to training the field access readiness neural network of block 702. In the illustrated example of FIG. 8, the example neural network trainer 310 receives in a neural network a weather metric or a field metric (block 802).

At block 804, the example neural network trainer 310 generates from the neural network a field condition at a time of operation based on the weather metric or the field metric.

At block 806, the example neural network trainer 310 compared the field condition generated in block 804 with a decision in the example behavior decision database 124. To train the neural network to generate accurate predictions, the accuracy of a field condition is compared with a field condition associated with a historical field access decision made by a farming market participant (block 806).

FIG. 9 is a flowchart representative of additional detail corresponding to generating a first probability of block 714. In the illustrated example of FIG. 9, the example probability generator circuitry 316 compares a third probability of the field condition at the time of operation given the first operating decision with a second probability of the field condition at the time of operation (block 902). In some examples, the example probability generator circuitry 316 determines the first probability in a manner consistent with example Equation 1 (block 902).

At block 904, the example probability generator circuitry applies an input from the neural network to normalize the result of block 902.

FIG. 10 is a flowchart representative of additional detail corresponding to generating a machine plan for the field of block 722. In the illustrated example of FIG. 10, the example map generator circuitry 318 uses the first probability and the machine characteristic to determine a machine for the field and when to use the machine on the field (block 1002).

FIG. 11 is a block diagram of an example processor platform 1100 structured to execute and/or instantiate the machine readable instructions and/or the operations of FIGS. 7-10 to implement the example field access readiness server circuitry 126 of FIG. 3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example neural network trainer circuitry 310, the example data retrieval circuitry 312, the example field condition generator circuitry 314, the example probability generator circuitry 316, the example map generator circuitry 318, the example machine plan generator circuitry 320, the example machine plan communication circuitry 322, the example data storage circuitry 324, and the example field access readiness server circuitry 126 of FIG. 3.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 7-10, may be stored in the mass storage device 1128, in the volatile memory 1114, in the non-volatile memory 1116, and/or on a removable non-transitory computer readable storage medium such as a CD or DVD.

Figure 12:
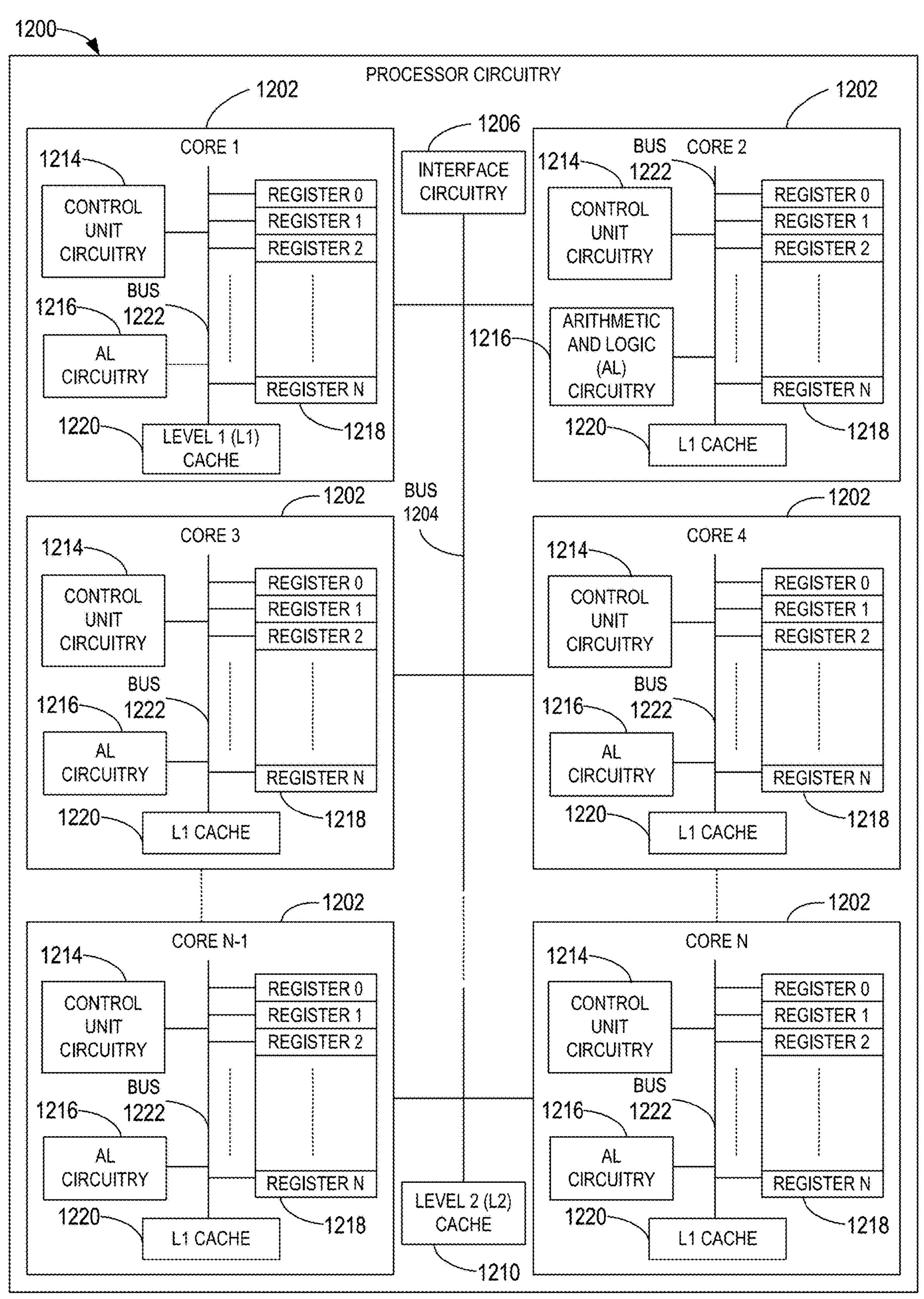
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may be a general purpose microprocessor (e.g., general purpose microprocessor circuitry). The microprocessor 1200 executes some or all of the machine readable instructions of the flowcharts of FIGS. 7-10 to effectively instantiate the circuitry of FIG. 3 as logic circuits to perform the operations corresponding to those machine readable instructions. In some such examples, the circuitry of FIG. 3 is instantiated by the hardware circuits of the microprocessor 1200 in combination with the instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 7-10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (Ics) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
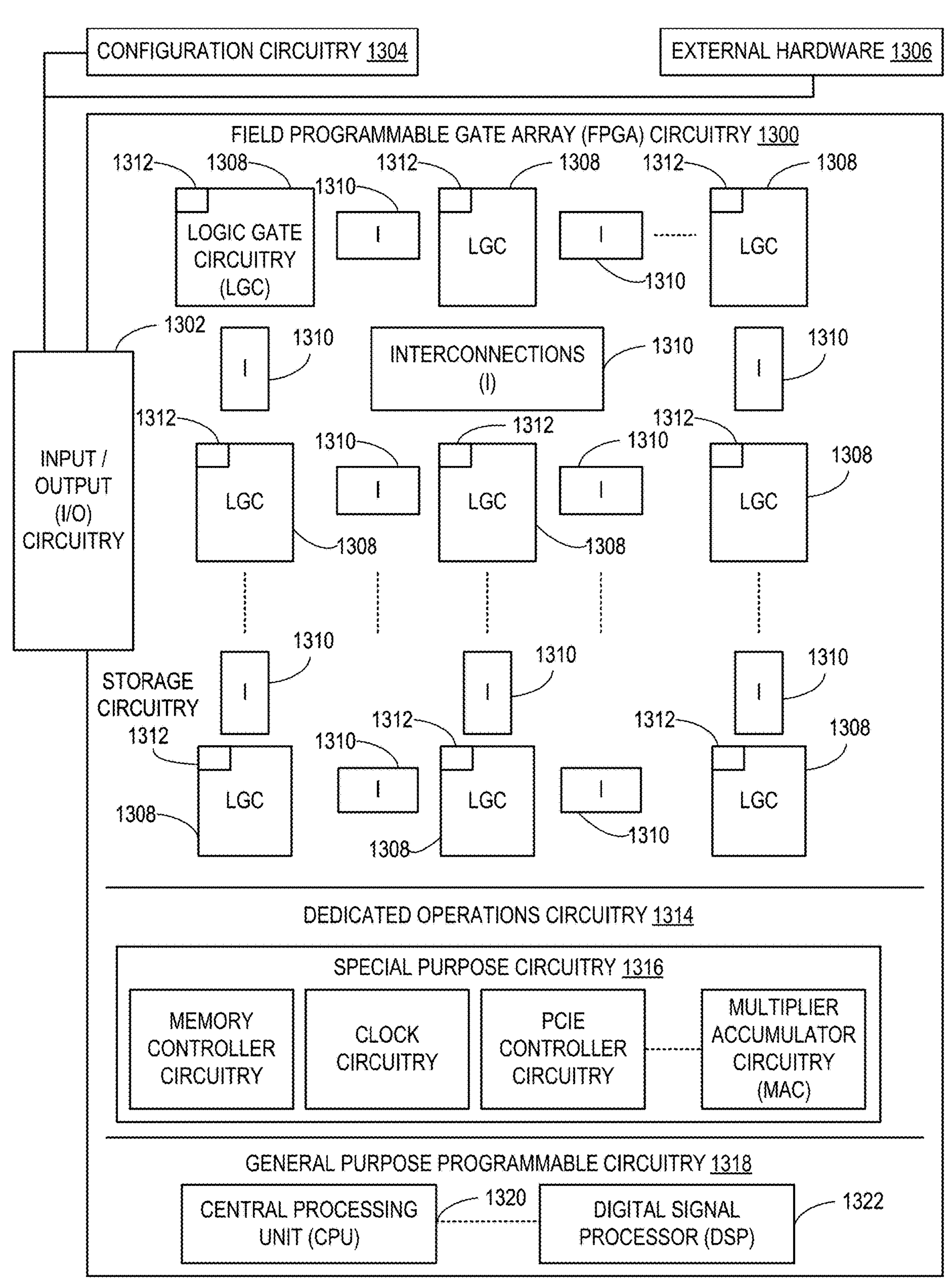
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 7-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 7-10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 7-10. As such, the FPGA circuitry 1300 may be structured to effectively instantiate some or all of the machine readable instructions of the flowcharts of FIGS. 7-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 7-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may be implemented by external hardware circuitry. For example, the external hardware 1306 may be implemented by the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations that may correspond to at least some of the machine readable instructions of FIGS. 7-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 7-10 may be executed by one or more of the cores 1202 of FIG. 12, a second portion of the machine readable instructions represented by the flowcharts of FIGS. 7-10 may be executed by the FPGA circuitry 1300 of FIG. 13, and/or a third portion of the machine readable instructions represented by the flowcharts of FIGS. 7-10 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
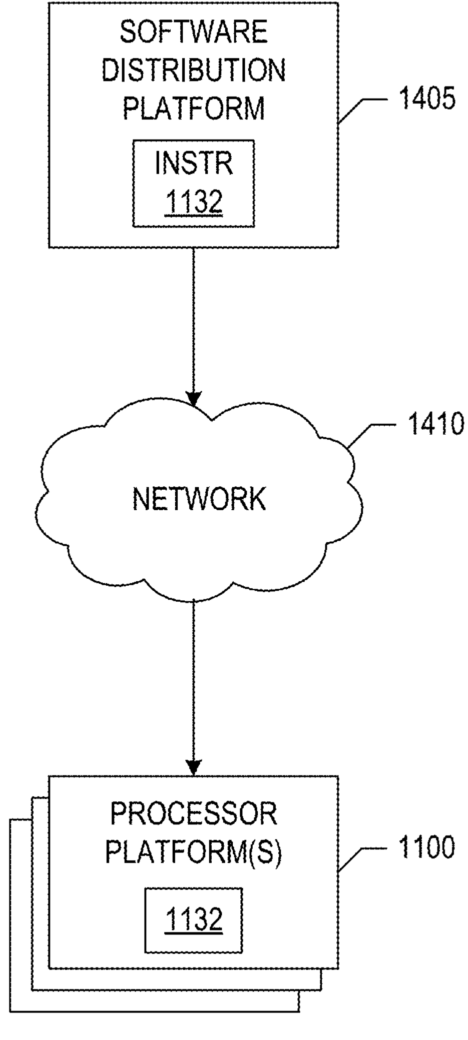
FIG. 14 is a block diagram of an example software distribution platform (e.g., one or more servers) to distribute software (e.g., software corresponding to the example machine readable instructions of FIGS. 7-10) to client devices (e.g., electronic devices, machines, etc.) associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions of FIGS. 7-10, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions of FIGS. 7-10, may be downloaded to the example processor platform 1100, which is to execute the machine readable instructions 1132 to implement the example field access readiness server circuitry 126. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that determine field access readiness. Disclosed systems, methods, apparatus, and articles of manufacture improve the efficiency of using a computing device by streamlining the field access readiness determination, generating machine plans, and communicating the machine plans to machines to deploy and execute work. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method to determine field access readiness, the method comprising:

receiving in a neural network a field metric associated with a first field;

receiving in the neural network a previous field operating decision that describes whether a second field was accessed during a previous time;

generating from the neural network a future field access recommendation at a future time of operation based on the field metric;

generating, with the neural network, a probability that the first field may be accessed given the future field access recommendation at the future time of operation, the probability based on the previous field operating decision and the future field access recommendation at the future time of operation; and applying the probability to the first field, or subset areas of the first field by the field metric.

2. The method of claim 1, wherein the probability is a first probability, and wherein the method includes generating the first probability by:

comparing a third probability of the future field access recommendation at the future time of operation given the previous field operating decision with a second probability of the future field access recommendation at the future time of operation; and applying an input from the neural network to normalize.

3. The method of claim 1, further generating a field readiness map for the field.

4. The method of claim 1, wherein the neural network stores a subsequent field operating decision in a behavior decision database.

5. The method of claim 1, wherein the neural network can receive a machine characteristic.

6. The method of claim 5, including generating a machine plan for the field based on the first probability and the machine characteristic.

7. The method of claim 6, wherein:

the machine is a first machine within a plurality of machines that are configurable to perform operations within the first field; and the machine plan for the field identifies the first field, identifies the first machine, and identifies the future time of operation.

8. The method of claim 7, including communicating the machine plan for the first field to the machine to deploy and execute work on the first field.

9. The method of claim 1, wherein the neural network can receive a weather metric.

10. The method of claim 9, wherein the neural network can generate a field condition at a time of operation based on the weather metric or the field metric.

11. An apparatus to determine field access readiness, the apparatus comprising:

at least one memory;

machine readable instructions; and processor circuitry to at least one of instantiate or execute the machine readable instructions to:

receive in a neural network a field metric associated with a first field;

receive in the neural network a previous field operating decision that describes whether a second field was accessed during a previous time;

generate from the neural network a future field access recommendation at a future time of operation based on the field metric;

generate, with the neural network, a probability that the first field may be accessed given the future field access recommendation at the future time of operation, the probability based on the previous field operating decision and the future field access recommendation at the future time of operation; and apply the probability to the first field, or subset areas of the first field by the field metric.

12. The method of claim 1, wherein the first field and the second field are separate areas of land at different geographic locations.

* * * * *